(12) United States Patent
Gilbert

(10) Patent No.: US 8,759,998 B2
(45) Date of Patent: Jun. 24, 2014

(54) ENERGY RECOVERY SYSTEM AND METHOD FOR EXHAUST ENERGY CAPTURE AND ELECTRICAL GENERATION

(71) Applicant: Jeffrey Ryan Gilbert, Hillsboro, OR (US)

(72) Inventor: Jeffrey Ryan Gilbert, Hillsboro, OR (US)

( * ) Notice: Subject to any disclaimer, the term of this patent is extended or adjusted under 35 U.S.C. 154(b) by 0 days.

(21) Appl. No.: 13/754,624

(22) Filed: Jan. 30, 2013

(65) Prior Publication Data

US 2013/0147200 A1 Jun. 13, 2013

Related U.S. Application Data

(63) Continuation of application No. 13/557,018, filed on Jul. 24, 2012, now Pat. No. 8,384,234, which is a continuation of application No. 13/193,267, filed on Jul. 28, 2011, now Pat. No. 8,253,267, which is a continuation of application No. 12/388,457, filed on Feb. 18, 2009, now Pat. No. 8,013,465.

(60) Provisional application No. 61/066,445, filed on Feb. 19, 2008.

(51) Int. Cl.
  *F03D 9/00* (2006.01)
(52) U.S. Cl.
  USPC .............................................. 290/55; 290/54
(58) Field of Classification Search
  USPC .......................................................... 290/55
  See application file for complete search history.

(56) References Cited

U.S. PATENT DOCUMENTS

| | | | |
|---|---|---|---|
| 1,013,798 A | 1/1912 | Messina | |
| 2,608,054 A | 8/1952 | Price | |
| 3,720,840 A | 3/1973 | Gregg | |
| 4,002,218 A | 1/1977 | Horvat | |
| 4,128,769 A | 12/1978 | Bons et al. | |
| 4,154,556 A | 5/1979 | Webster | |
| 4,392,063 A | 7/1983 | Lindquist | |
| 4,452,046 A | 6/1984 | Valentin | |
| 4,464,580 A | 8/1984 | Miller et al. | |
| 4,468,153 A | 8/1984 | Gutierrez Atencio | |
| 4,508,973 A | 4/1985 | Payne | |
| 5,512,788 A | 4/1996 | Berenda et al. | |
| 5,734,202 A | 3/1998 | Shuler | |
| 5,850,108 A | 12/1998 | Bernard | |
| 5,998,882 A | 12/1999 | Alston | |
| 6,365,985 B1 | 4/2002 | Cohen | |
| 6,655,907 B2 * | 12/2003 | Brock et al. | 415/4.2 |
| 6,710,468 B1 | 3/2004 | Marrero O'Shanahan | |
| 6,856,042 B1 | 2/2005 | Kubota | |
| 6,952,058 B2 | 10/2005 | McCoin | |

(Continued)

*Primary Examiner* — Michael Zarroli
(74) *Attorney, Agent, or Firm* — Marger Johnson & McCollom, PC

(57) ABSTRACT

An exhaust energy recovery and electrical generation system includes a conduit having a first end and a second end, wherein the first end of the conduit is configured to receive a gas flow transmitted by a gas flow channel of a gas flow source and wherein the conduit is configured to transmit the received gas flow from the first end thereof toward the second end thereof. A first blade assembly is coupled to the conduit, wherein the first blade assembly is configured to be moved when the received gas flow is transmitted from the first end of the conduit; and an electrical generator coupled to the first blade assembly to generate electricity when the first blade assembly moves. A cross-sectional area of the first end of the conduit may be less than a cross-sectional area of the gas flow channel.

3 Claims, 17 Drawing Sheets

(56) References Cited

U.S. PATENT DOCUMENTS

| | | |
|---|---|---|
| 6,956,300 B2 | 10/2005 | Gizara |
| 7,043,905 B2 * | 5/2006 | Turchetta ........................ 60/409 |
| 7,200,005 B2 | 4/2007 | Von Gutfeld et al. |
| 7,215,037 B2 | 5/2007 | Scalzi |
| 7,479,709 B2 | 1/2009 | Hsiung et al. |
| 7,663,261 B2 | 2/2010 | Miller et al. |
| 2005/0217259 A1 | 10/2005 | Turchetta |
| 2006/0002786 A1 | 1/2006 | Richter |
| 2008/0061559 A1 * | 3/2008 | Hirshberg ........................ 290/55 |
| 2009/0134623 A1 | 5/2009 | Krouse |
| 2010/0001532 A1 | 1/2010 | Grumazescu |
| 2010/0270802 A1 | 10/2010 | Presz, Jr. et al. |

* cited by examiner

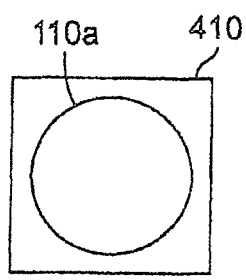
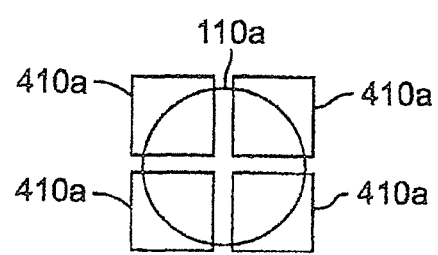
FIG. 5A    FIG. 5B
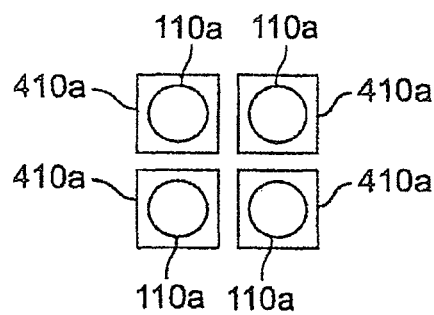
FIG. 5C

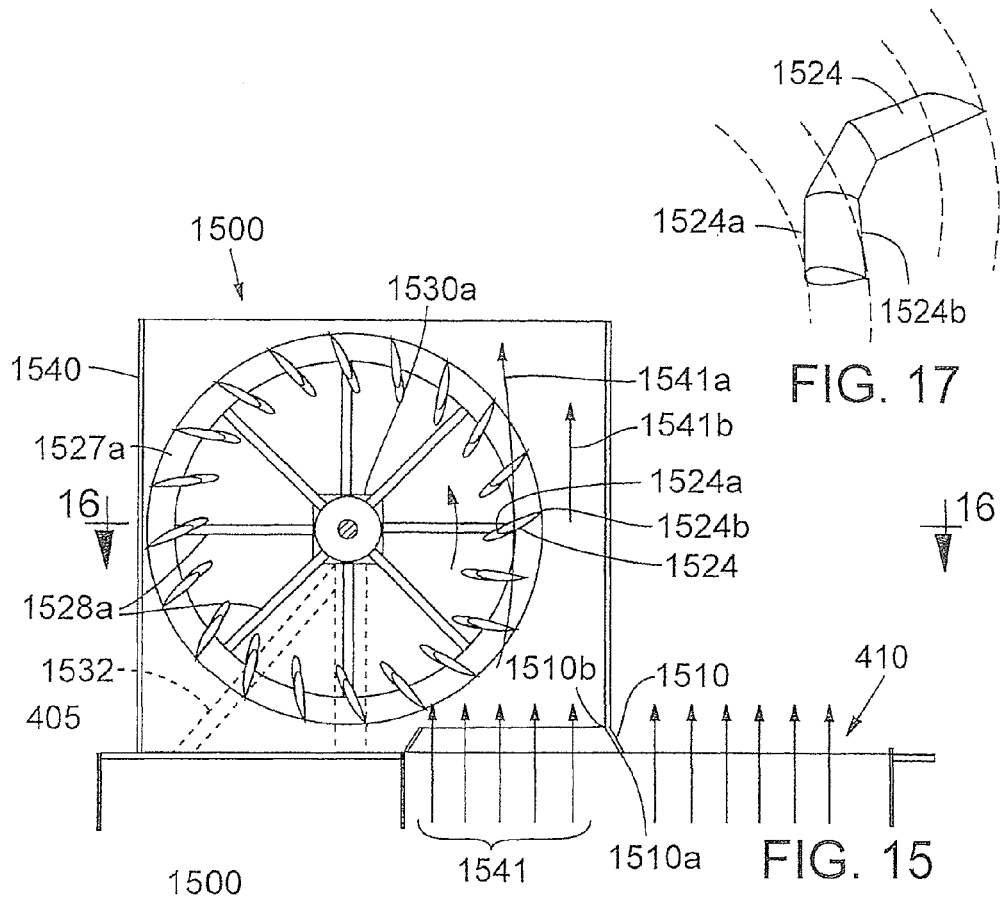
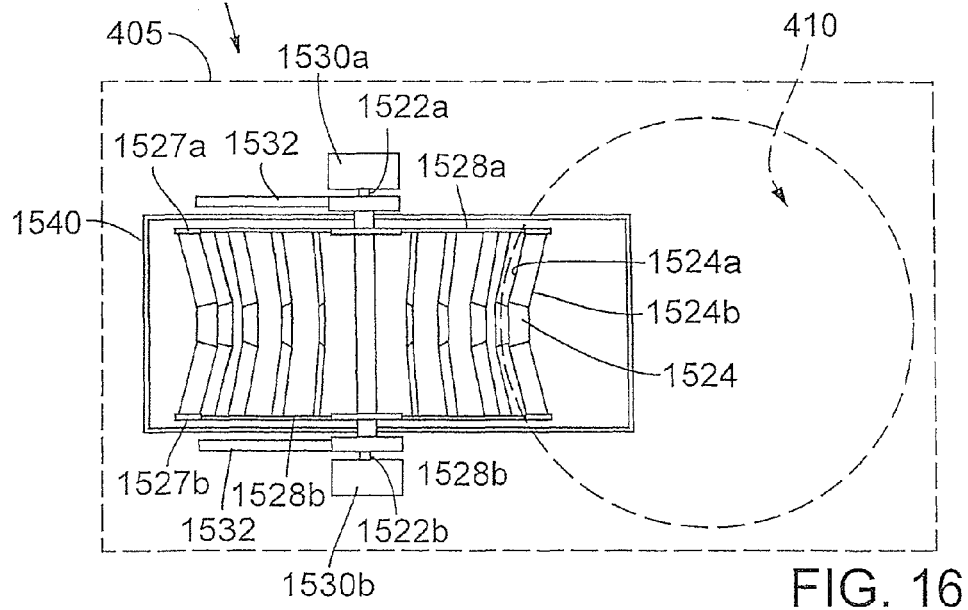

ENERGY RECOVERY SYSTEM AND METHOD FOR EXHAUST ENERGY CAPTURE AND ELECTRICAL GENERATION

CROSS-REFERENCE TO RELATED PATENT APPLICATIONS

This application is a continuation of U.S. application Ser. No. 13/557,018, filed Jul. 24, 2012, now U.S. Pat. No. 8,384,234 B1, issued Feb. 26, 2013, which is a continuation of U.S. application Ser. No. 13/193,267, filed Jul. 28, 2011, now U.S. Pat. No. 8,253,267 B2, issued Aug. 28, 2012, which is a continuation of U.S. application Ser. No. 12/388,457, filed Feb. 18, 2009, now U.S. Pat. No. 8,013,465 B2, issued Sep. 6, 2011, which claims benefit of U.S. provisional application Ser. No. 61/066,445, filed Feb. 19, 2008, all herein incorporated by reference.

TECHNICAL FIELD

Embodiments of inventive concepts exemplarily described herein relate generally to devices capable of converting kinetic energy associated with a gas flow into electricity. More particularly, embodiments exemplarily described herein relate to energy recovery devices capable of converting kinetic energy associated with a gas flow into electricity while preventing an undesirable amount of back pressure from being exerted against the gas flow.

BRIEF DESCRIPTION OF THE DRAWINGS

The above and other embodiments of the present invention will become more apparent with reference to the attached drawings in which:

FIGS. 5A-5C are schematic views exemplarily illustrating a relationship between a cross-sectional area of a first end of a conduit in the energy recovery system shown in FIGS. 1-3 and a gas flow source;

FIG. 15 is a side view of an energy recovery system according to a sixth embodiment;

FIG. 16 is a top view of the energy recovery system shown in FIG. 15;

FIG. 17 is perspective schematic view of a blade incorporated within the energy recovery system shown in FIG. 15;

DETAILED DESCRIPTION

Embodiments of inventive concepts will be exemplarily described herein with reference to the accompanying drawings. These embodiments may, however, be realized in many different forms and should not be construed as being limited to the description set forth herein. The features of the inventive concepts described herein may be employed in varied and numerous embodiments without departing from the scope of the present invention.

Embodiments exemplarily described herein can be generally characterized as an energy recovery system capable of converting the kinetic energy of a gas flow generated by a gas flow source into electricity while preventing an undesirable amount of back pressure from being exerted against the gas flow.

Figure 1:
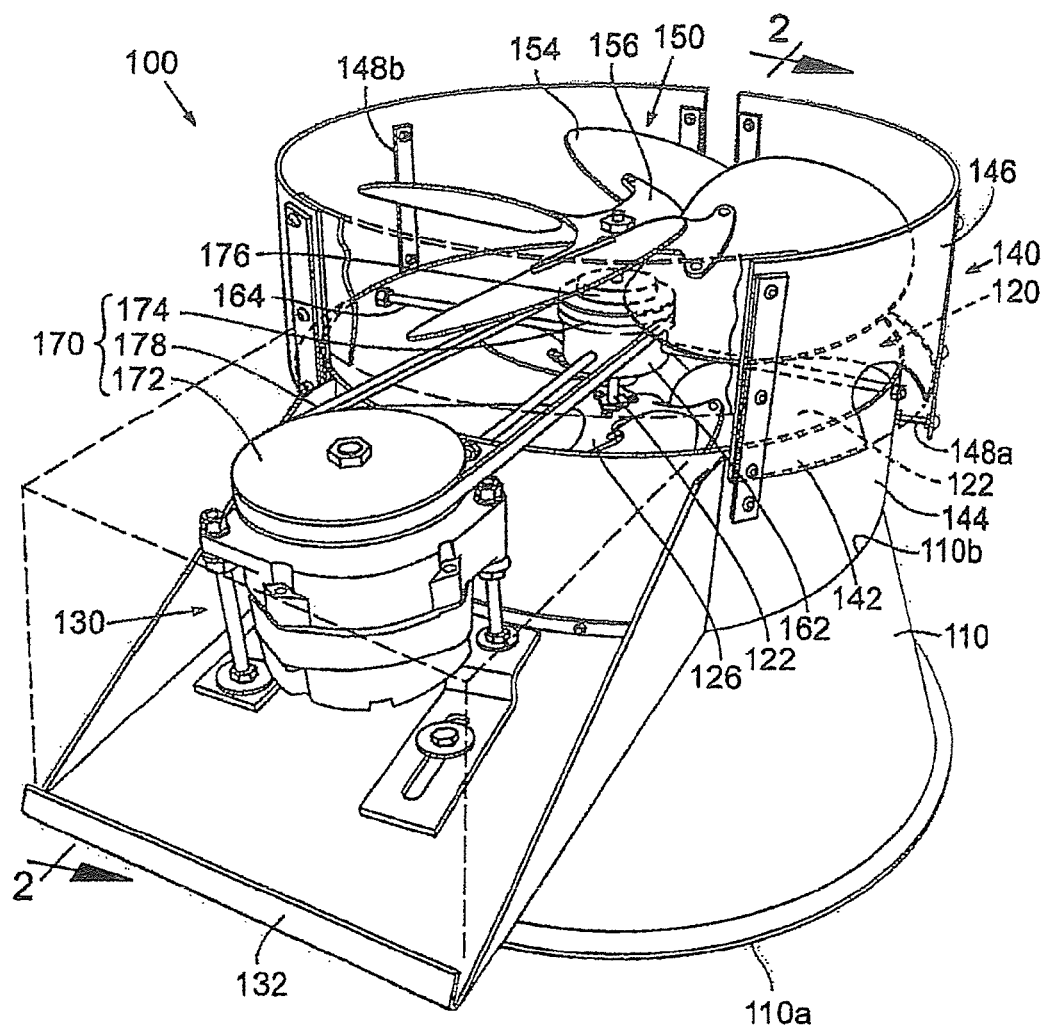
FIG. 1 is a perspective schematic view of an energy recovery system according to a first embodiment.
Figure 2:
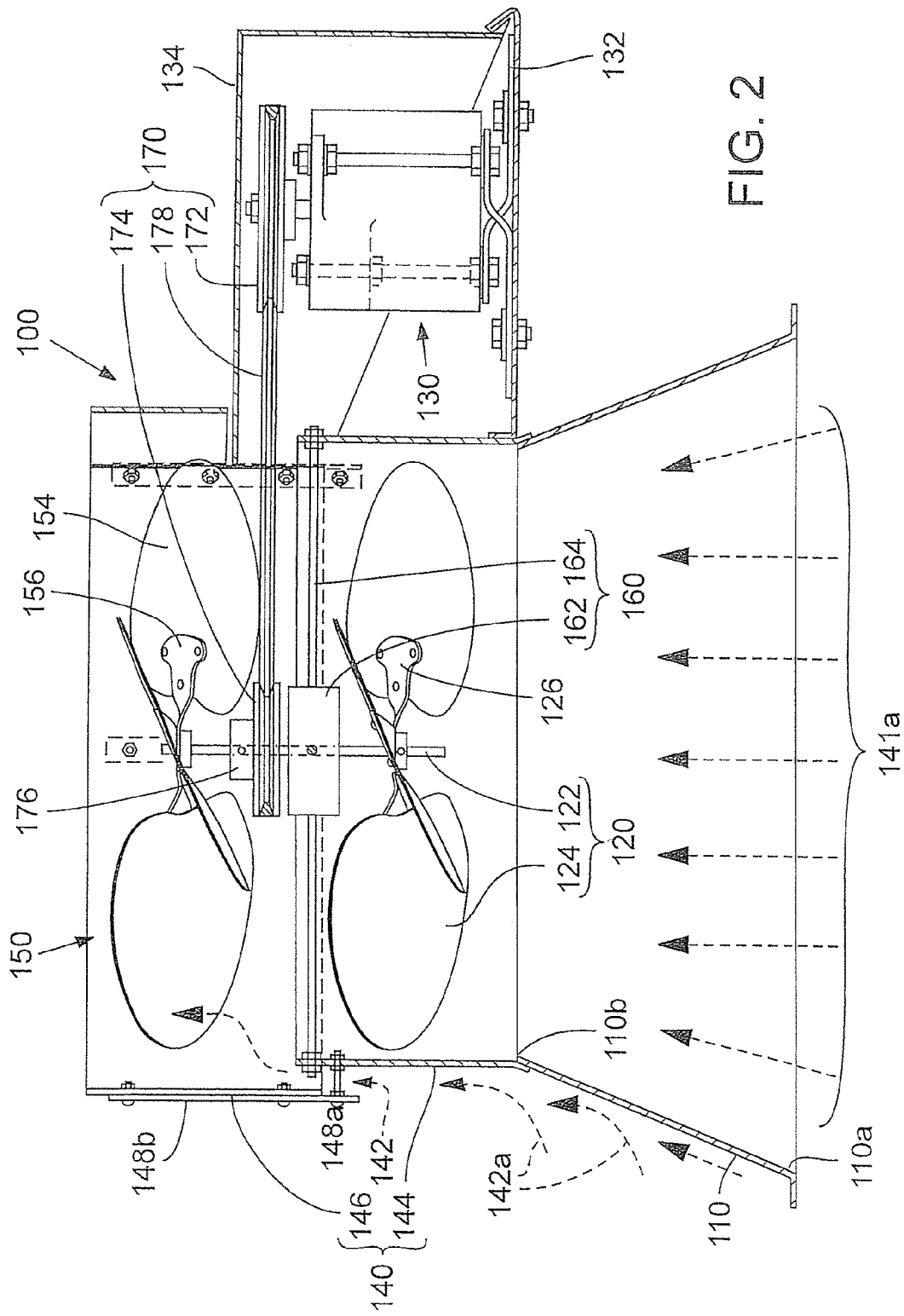
FIG. 2 is a cross-sectional view of the energy recovery system shown in FIG. 1, taken along line 2-2 shown in FIG. 1.
Figure 3:
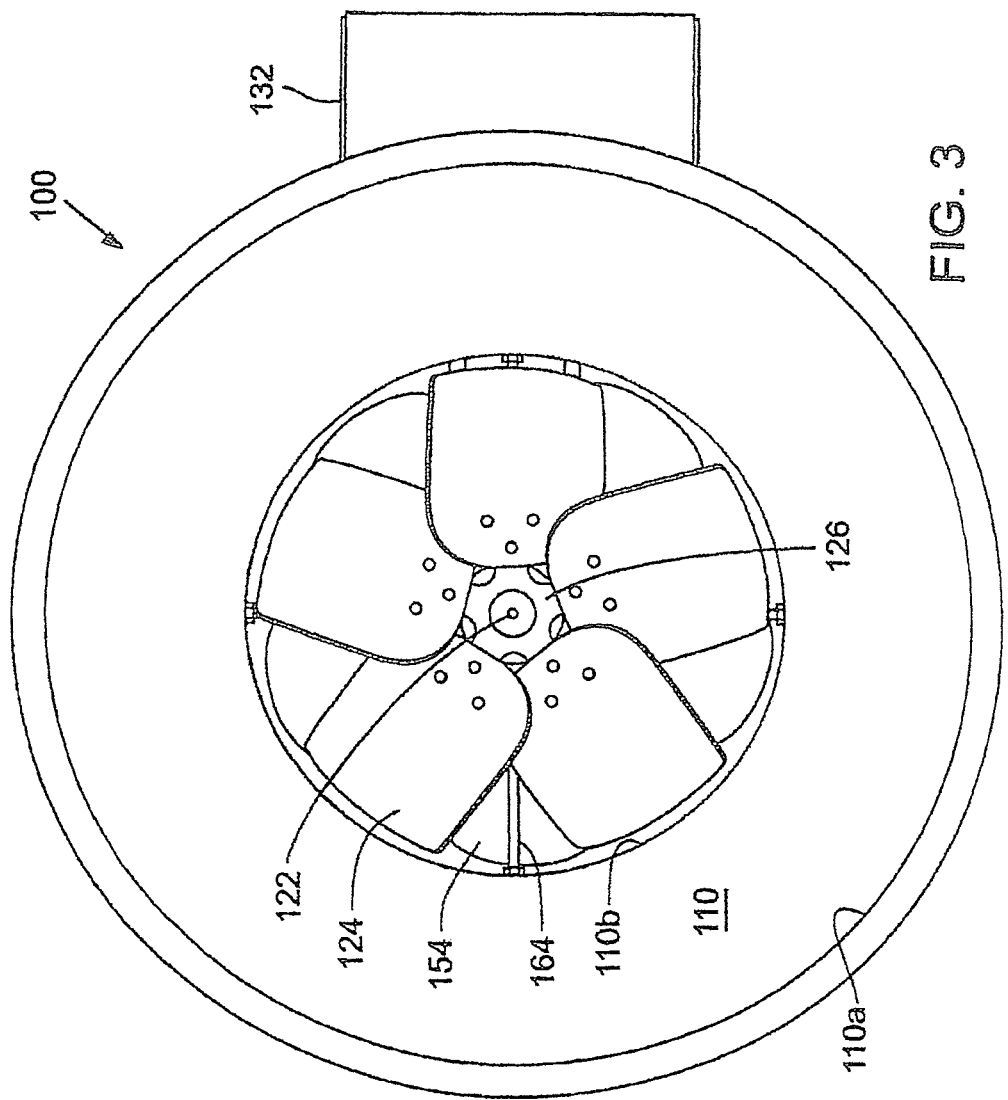
FIG. 3 is a bottom view of the energy recovery system shown in FIG. 1.

FIG. 1 is a perspective schematic view of an energy recovery system according to a first embodiment. FIG. 2 is a cross-sectional view of the energy recovery system shown in FIG. 1, taken along line II-II'. FIG. 3 is a bottom view of the energy recovery system shown in FIG. 1.

Referring to FIGS. 1-3, an energy recovery system 100 may be generally characterized as including a conduit 110, a first blade assembly 120 and an electrical generator 130.

The conduit 110 may include a first end 110a and a second end 110b. The first end 110a may be configured to receive a first portion 141a of a gas flow 141 (FIG. 4A) generated by a gas flow source (not shown). Further, the conduit 110 may be generally configured to transmit the received gas flow from the first end 110a toward the second end 110b.

The conduit 110 is configured to compress gas transmitted from the first end 110a of the conduit 110. To compress the gas, the conduit 110 may, for example, be configured such that the second end 110b thereof is narrower than the first end 110a thereof. As a result, gas received at the first end 110a of the conduit 110 can be compressed as it is transmitted from the first end 110a toward the second end 110b. It will be appreciated that the specific dimensions of the conduit 110 may vary depending on the configuration and requirements of the gas flow source. In one embodiment, however, the first end 110a of the conduit 110 may have a diameter of 26 inches and the second end 110b of the conduit 110 may have a diameter of 18.5 inches. Moreover, the length of the conduit 110 (i.e., from the first end 110a to the second end 110b) may be 10 inches.

The first blade assembly 120 is coupled to the conduit 110. The first blade assembly 120 may be configured to be moved when the received gas flow is transmitted from the first end 110a of the conduit 110. The first blade assembly 120 may, for example, include a rotatable shaft 122 and a plurality of blades 124 coupled to the rotatable shaft 122. The plurality of blades 124 may be configured to be moved in a predetermined direction (e.g., rotation in a clockwise direction, as shown in FIG. 1) when the received gas flow is transmitted from the first end 110a of the conduit 110. When the plurality of blades 124 move, the rotatable shaft 122 moves in the predetermined direction. In one embodiment, each of the plurality of blades 124 may be coupled to the rotatable shaft 122 via a corresponding blade connection member 126. Accordingly, each blade connection member 126 may fix a corresponding one of the blades 124 at a predetermined pitch angle, $\Phi_1$, measured from a direction perpendicular to a longitudinal axis of the rotatable shaft 122. It will be appreciated that the specific configuration of the blades 124 may vary depending on the configuration and requirements of the gas flow source. In one embodiment, however, the plurality of blades 124 may consist of five blades and the pitch angle $\Phi_1$ may be 33° inclined with respect to the clockwise direction. In another embodiment, each blade 124 may have a length of about 9 inches.

The electrical generator 130 may be coupled to the first blade assembly 120. The electrical generator 130 is configured to generate electricity when the first blade assembly 120 moves.

In one embodiment, the energy recovery system 100 may further include a second blade assembly 150 adjacent to the first blade assembly 120 and coupled to the electrical generator 130. The second blade assembly 150 is configured to be moved when the gas received at the first end 110a of the conduit 110 is transmitted beyond the first blade assembly 120.

Similar to the first blade assembly 120, the second blade assembly 150 may, for example, a plurality of blades 154 coupled to the rotatable shaft 122. The plurality of blades 154 may be configured to be moved in a predetermined direction (e.g., rotation in a clockwise direction, as shown in FIG. 1) when the received gas flow is transmitted beyond the first blade assembly 120. When the plurality of blades 154 move, the rotatable shaft 122 moves in the predetermined direction. In one embodiment, each of the plurality of blades 154 may be offset from the plurality of blades 124 to minimize the amount of gas flow that is not used to move a blade assembly. In one embodiment, each of the plurality of blades 154 may be coupled to the rotatable shaft 122 via a blade connection member 156. Accordingly, the blade connection member 156 may fix the blades 154 at a predetermined pitch angle, $\Phi_2$, measured from a direction perpendicular to a longitudinal axis of the rotatable shaft 122. Pitch angle $\Phi_2$ may be the same as or different from pitch angle $\Phi_1$. It will be appreciated that the specific configuration of the blades 154 may vary depending on the configuration and requirements of the gas flow source. In one embodiment, however, the plurality of blades 154 may consist of four blades and the pitch angle $\Phi_2$ may be 27° inclined with respect to the clockwise direction. In another embodiment, each blade 154 may have a length of about 9 inches.

The energy recovery system 100 may further include a shroud member 140. The shroud member 140 may be coupled to the second end 110b of the conduit 110. The first blade assembly 120 may be disposed within the shroud member 140. Similarly, the second blade assembly 150 may be disposed within the shroud member 140. Accordingly, the shroud member 140 may serve to protect the first blade assembly 120 and the second blade assembly 150 from undesirable gas flows in the ambient environment. In one embodiment, a distance between the blades 124 and the shroud member 140 is minimal (e.g., about ⅛ of an inch). As exemplarily shown, the electrical generator 130 may be disposed outside the shroud member 140. It will be appreciated, however, that the electrical generator 130 may be disposed within the shroud member 140. For example, the electrical generator 130 may be disposed within the shroud member 140 and be coupled to the first blade assembly 120 in a manner similar to that discussed with respect to FIG. 8.

As exemplarily illustrated in FIGS. 1 and 2, the shroud member 140 may include an air intake port 142 defined therethrough and be configured to receive an ambient gas (e.g., air) outside the conduit 110 and direct the ambient gas toward the second blade assembly 150, as shown by arrow 142a. For example, ambient gas may be deflected by the exterior surface of the conduit 110 into the air intake port 142. The air intake port 142 transmits the deflected ambient gas into the interior of the shroud member 140 toward the face of the blades 154. The flow of ambient gas to the face of the blades 154 acts on the blades 154, facilitating movement of the blades 154 in the predetermined direction.

In one embodiment, the shroud member 140 includes a first shroud body 144 coupled to the second end 110b of the conduit 110 and a second shroud body 146 coupled to the first shroud body 144 in a spaced-apart manner such that the air intake port 142 is defined between the first shroud body 144 and the second shroud body 146. The first shroud body 144 and the second shroud body 146 may be coupled to each other via first shroud body connection members 148a and second shroud body connection members 148b. Each first shroud body connection member 148a may include a first end and a second end opposite the first end. The first end of each first shroud body connection member 148a and the second end of each first shroud body connection member 148a is connected to an end of a corresponding second shroud body connection member 148b. The second shroud body 146 is connected to one or more regions of each of the second shroud body connection member 148b. Constructed as exemplarily described above, the first shroud body connection member 148a and the second shroud body connection member 148b fix the first shroud body 144 and the second shroud body 146 relative to each other so as to define the air intake port 142.

In the embodiment exemplarily described above, the shroud member 140 is provided as a plurality of separate components coupled together in a manner that defines the air intake port 142 capable of transmitting ambient gas toward the second blade assembly 150. In other embodiments, however, the shroud member 140 may be provided as a single, integral component through which one or more air intake ports 142 may extend. Similarly, and although not shown, one or more air intake ports may extend through a lower portion of the first shroud body 144 to transmit ambient gas toward the first blade assembly 120 (e.g., to the face of the blades 124). The flow of ambient gas to the face of the blades 124 acts on the blades 124, facilitating movement of the blades 124 in the predetermined direction.

As mentioned above, the first blade assembly 120 may be disposed within the shroud member 140. In one embodiment, the first blade assembly 120 may be fixed to the first shroud body 144 by a blade assembly connection member 160. As exemplarily illustrated, the blade assembly connection member 160 includes an axial connection member 162 and a plurality of radial connection members 164. The axial connection member 162 (e.g., a drive shaft) is coupled to rotatable shaft 122 and fixes the rotatable shaft 122 in alignment with a longitudinal axis of the conduit 110. Each of the plurality of radial connection members 164 includes a first end and a second end opposite the first end. The first end of each radial connection member 164 is coupled to the first shroud body 144 and the second end of each radial connection member 164 is coupled to the axial connection member 162. The radial connection members 164 are sufficiently rigid to prevent undesirable movement of the axial connection member 162 when the first blade assembly 120 moves.

As mentioned above, the second blade assembly 150 may be disposed within the shroud member 140. In one embodiment, the rotatable shaft 122 of the second blade assembly 150 may be coupled to the axial connection member 162. Accordingly, the axial connection member 162 fixes the rotatable shaft 122 in alignment with the longitudinal axis of the conduit 110 and the radial connection members 164 are also sufficiently rigid to prevent undesirable movement of the axial connection member 162 when the second blade assembly 150 moves.

As mentioned above, the electrical generator 130 may be coupled to the first blade assembly 120 and be configured to generate electricity when the first blade assembly 120 moves. In one embodiment, the electrical generator 130 may be coupled to the first blade assembly 120 via a belt and pulley system 170. The belt and pulley system 170 may, for example, include a first pulley 172 coupled to the electrical generator 130, a second pulley 174 coupled to the rotatable shaft 122. In one embodiment, the second pulley 174 may be coupled to the rotatable shaft 122 via a pulley connection member 176 that, in turn is fixed to the rotatable shaft 122. The first pulley 172 and the second pulley 174 are connected to each other by a belt 178.

Although the electrical generator 130 is described above as being coupled to the first blade assembly 120 by a belt and pulley system 170, it will be appreciated that the electrical generator 130 may be coupled to the first blade assembly 120 by any suitable means. For example, the electrical generator 130 may be coupled to the first blade assembly 120 directly (e.g., as a direct-drive system), by gears, or the like. Further, although the energy recovery system 100 is described above as including a single electrical generator 130, it will be appreciated that the energy recovery system 100 may include a plurality of electrical generators 130 coupled to the first blade assembly 120 and/or the second blade assembly 150. Each of the electrical generators 130 may be configured to generate the same or a different power output when the first blade assembly 120 and/or the second blade assembly 150 moves.

In one embodiment, the electrical generator 130 may be coupled to the shroud member 140 (e.g., at the first shroud body 144) via a support tray 132. A removable housing 134 may be provided on the support tray 132 to surround and protect the electrical generator 130 from the ambient environment. In one embodiment, the removable housing 134 may be provided as a substantially clear material to permit inspection of the electrical generator 130.

To convert the kinetic energy of a gas flow into electricity, the energy recovery system 100 may be disposed so that the first end 110a of the conduit 110 receives a first portion 141a of a gas flow generated by a gas flow source. The received gas flow 141a is then transmitted from the first end 110a of the conduit 110 toward the second end 110b of the conduit 110. When transmitted from the first end 110a of the conduit 110, the received gas flow acts upon the first blade assembly 120. Also, when the received gas flow is transmitted toward the second end 110b of the conduit 110, the gas becomes compressed because the second end 110b of the conduit 110 is narrower than the first end 110a of the conduit 110. Thus, a pressure of the gas at the second end 110b of the conduit 110 is higher than a pressure of the gas at the first end 110a of the conduit 110. When the first blade assembly 120 is acted upon by the high-pressure gas within the received gas flow, the plurality of blades 124 move in a predetermined direction (e.g., rotate in a clockwise direction about an axis that is substantially parallel with the longitudinal axis of the conduit 110). Gas within the gas flow is then released into the ambient environment and/or the gas flow channel of the gas flow source (e.g., gas flow source 400) via the shroud member 140.

Thus, gas transmitted beyond the first blade assembly 120 is released into the ambient environment and/or the gas flow channel of the gas flow source (e.g., gas flow source 400) via the shroud member 140. Movement of the plurality of blades 124 causes corresponding movement of the rotatable shaft 122 which, in turn, causes corresponding movement of the second pulley 174. Movement of the second pulley 174 is translated into movement of the first pulley 172 by the belt 178. When the first pulley 172 moves, the electrical generator 130 generates electricity. Thus, the electrical generator 130 is configured to generate electricity when the first blade assembly 120 moves.

In embodiments where the energy recovery system 100 includes the second blade assembly 150, the gas received at the first end 110a of the conduit may also be transmitted beyond the first blade assembly 120 to act upon the second blade assembly 150. Gas within the gas flow is then released into the ambient environment and/or the gas flow channel of the gas flow source (e.g., gas flow source 400) via the shroud member 140. Thus, gas transmitted beyond the second blade assembly 150 is released into the ambient environment and/or the gas flow channel of the gas flow source (e.g., gas flow source 400) via the shroud member 140. When the second blade assembly 150 is acted upon by the gas transmitted beyond the first blade assembly 120, the plurality of blades 154 move in a predetermined direction which, in turn, causes corresponding movement of the rotatable shaft 122 and the second pulley 174. When the first pulley 172 moves, the electrical generator 130 generates electricity. Thus, the electrical generator 130 is configured to generate electricity when the first blade assembly 120 moves.

Figure 4A:
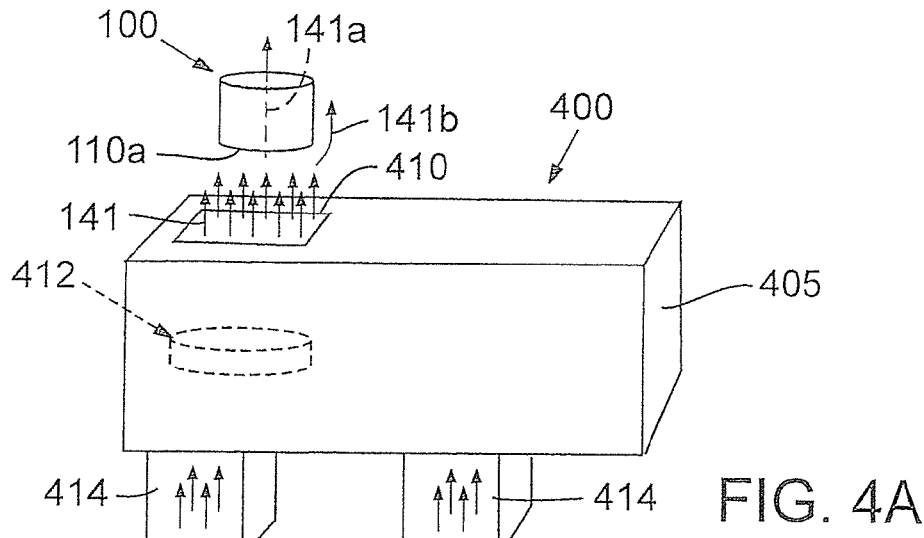
FIGS. 4A-4C are schematic views of exemplary locations where the energy recovery system shown in FIGS. 1-3 may be disposed relative to a gas flow source.
Figure 4B:
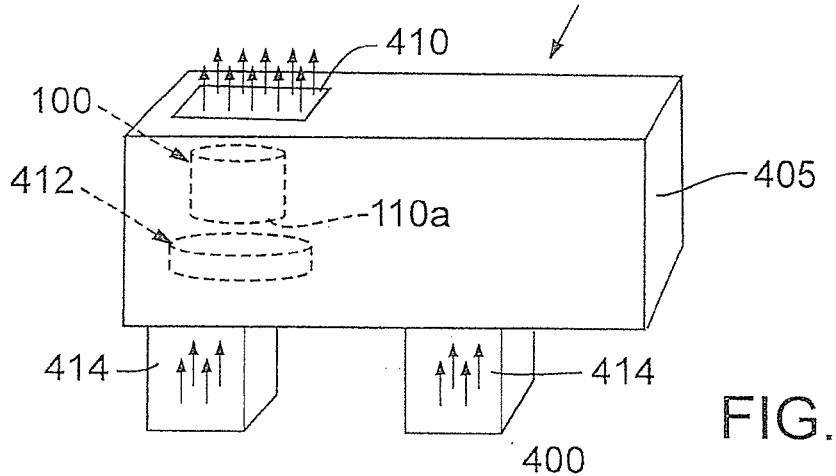
Figure 4C:
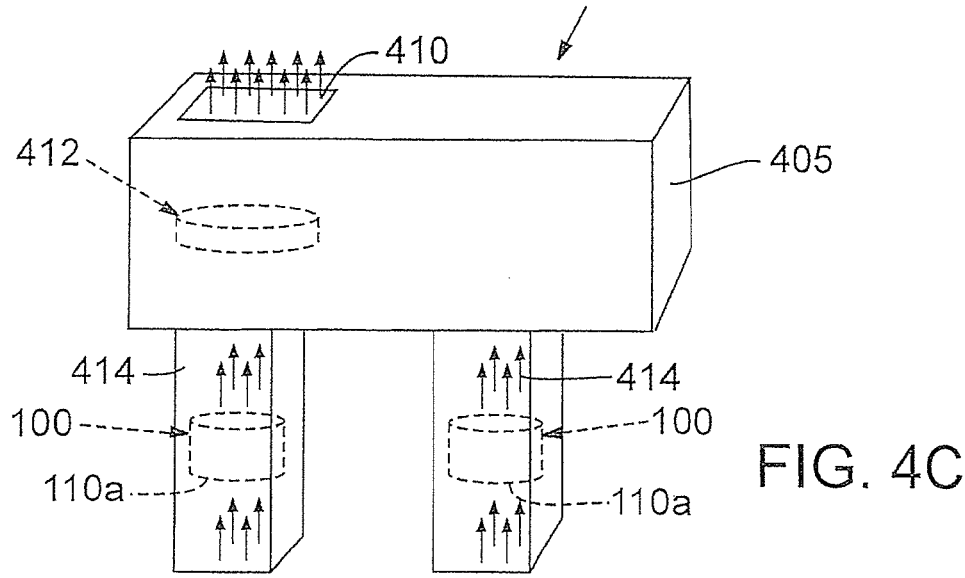

FIGS. 4A-4C are schematic views of exemplary locations where the energy recovery system shown in FIGS. 1-3 may be disposed relative to a gas flow source. FIGS. 5A-5C are schematic views exemplarily illustrating a relationship between a cross-sectional area of a first end of the conduit in the energy recovery system shown in FIGS. 1-3 and a gas flow source.

Constructed as exemplarily described above, the energy recovery system 100 can convert the kinetic energy of a gas flow generated by a gas flow source into electricity while preventing an undesirable amount of back pressure from being exerted against the gas flow. Referring generally to FIGS. 4A-4C, a gas flow source 400 may, for example, be provided as a ventilation system for a building (e.g., a hotel, airport, convention center, etc.) and include a air handling unit 405, an exhaust area 410, a blower unit 412, and ducts 414. During operation of the gas flow source 400 (e.g., during rotation of the blower unit 412), gas is drawn through ducts 414 connected to the air handling unit 405, thereby generating a gas flow (denoted by vertical arrows) within the ducts 414. With the air handling unit 405, the gas flow is directed to the blower unit 412 by way of one or more structures such as intake manifolds (not shown) thereby generating a gas flow within the air handling unit 405, up-wind from the blower unit 412. Thereafter, the blower unit 412 pushes the gas toward the exhaust area 410 thereby generating a gas flow within the air handling unit 405, down-wind from the blower unit 412. Subsequently, the pushed gas is exhausted from the gas flow source 400 through the exhaust area 410, thereby generating a gas flow through the exhaust area 410 of the air handling unit 405, outside the gas flow source 400. Because a gas flow is generated within the ducts 414, the air handling unit 405 and the exhaust area 410, each of the ducts 414, the air handling unit 405 and the exhaust area 410 may be generically referred to as a "gas flow channel" through which a gas flow is transmitted. As used herein, the cross-sectional area of a gas flow channel refers to the cross-sectional area of the gas flow channel along a direction perpendicular to the direction along which the gas flow is transmitted through the gas flow channel. During operation of the blower unit 412, the gas flow may be transmitted at a flow rate in a range of 500-5,000,000 CFM through any of the aforementioned gas flow channels. Thus, the energy recovery system 100 may be configured as desired to convert the kinetic energy of a gas flow having a flow rate in a range of 500-5,000,000 CFM into electricity. It will be appreciated that the energy recovery system 100 may also be configured as desired to convert the kinetic energy of a gas flow having a flow rate of less than 500 CFM or more than 5,000,000 CFM into electricity.

Referring to FIG. 4A, the energy recovery system 100 may be disposed outside the air handling unit 405 so that the first end 110a of the conduit 110 receives a first portion 141a of a gas flow 141 exhausted through the exhaust area 410. In one embodiment, the energy recovery system 100 may be coupled directly to an exterior of a housing of the gas flow source 400 using one or more brackets (not shown). Alternatively, the energy recovery system 100 may be coupled to another structure (not shown) adjacent to the gas flow source 400 (e.g., a wall). Regardless of the structure to which the energy recovery system 100 is coupled, the first end 110a of the conduit 110 should be maintained a sufficient distance away from the exhaust area 410 of the gas flow source 400 to bypass a second portion 141b of the gas flow so that the energy recovery system 100 does not generate an undesirable amount of back pressure within the gas flow source 400.

Referring to FIGS. 4A and 5A, it will be appreciated that the cross-sectional area of the first end 110a of the conduit 110 corresponds to a distance by which the first end 110a of the conduit 110 is separated from the exhaust area 410 of the gas flow source 400. Thus, the distance, D, separating the first end 110a of the conduit 110 and the exhaust area 410 is dependent upon the ratio, R, of the cross-sectional area of the first end 110a of the conduit 110 to the cross-sectional area of the exhaust area 410. In some embodiments, the cross-sectional area of the first end 110a of the conduit 110 is less than the cross-sectional area of the exhaust area 410, so R is less than 1. As R decreases from less than 1, the distance D can also decrease. In one embodiment, the cross-sectional area of the first end 110a of the conduit 110 is less than ⅔ the cross-sectional area of the exhaust area 410. Given a sufficiently large D, it will be appreciated that the cross-sectional area of the first end 110a of the conduit 110 can be equal to or greater than the cross-sectional area of the exhaust area 410. In such alternate embodiments, it is estimated that the first end 110a of the energy recovery unit 100 still receives only a portion of the gas flow exhausted through the exhaust area 410 due to the large D. Although the discussion has been made above with respect to the ratio between the cross-sectional area of the first end 110a of the conduit 110 and the cross-sectional area of the exhaust area 410, it will be appreciated that the discussion also applied with respect to the ratio between the cross-sectional area of the first end 110a of the conduit 110 and other of the aforementioned gas flow channels. That is, the ratio of the cross-sectional area of the first end 110a of the conduit 110 to the cross-sectional area of a duct 414 or blower unit 412 can be less than 1 to avoid the generation of an undesirable amount of back pressure within the gas flow source 400.

Although FIG. 5A illustrates wherein a single energy recovery system 100 is provided to receive a portion of the gas flow exhausted through a single exhaust area 410, a single energy recovery system 100 may be provided to receive a portion of each gas flow exhausted through a plurality of exhaust areas 410a, associated with one or more air handling units 405, as shown in FIG. 5B. The plurality of exhaust areas 410a may be collectively referred to as a single gas flow channel of the gas flow source 400, wherein the combined cross-sectional area of each of the exhaust areas 410a correspond to the cross-sectional area of such a gas flow channel. Although FIG. 5B illustrates wherein a single energy recovery system 100 is provided to receive a portion of each gas flow exhausted through a plurality of exhaust areas 410a, a plurality of energy recovery systems 100 may be provided to each receive a portion of a gas flow exhausted through a corresponding one of the plurality of discharge areas 410a, as shown in FIG. 5C.

Referring to FIG. 4B, the energy recovery system 100 may be disposed inside the gas flow source 400 so that the first end 110a of the conduit 110 receives a portion of a gas flow generated by the gas flow source 400. In the illustrated embodiment, the energy recovery system 100 is disposed down-wind from (i.e., behind) the blower unit 412. In another embodiment, however, the energy recovery system 100 may be disposed up-wind from (i.e., in front of) the blower unit 412. In one embodiment, the gas flow source 400 may be coupled directly to an interior of a housing of the gas flow source 400 using one or more brackets (not shown) to maintain the first end 110a of the conduit 110 a sufficient distance away from the blower unit 412 of the gas flow source 400 so that the energy recovery system 100 does not generate an undesirable amount of back pressure within the gas flow source 400.

Referring to FIG. 4C, the energy recovery system 100 described above may be disposed in-line with ducts 414 feeding the gas flow source 400 so that the first end 110a of the conduit 110 receives a portion of a gas flow generated by the gas flow source 400. In one embodiment, the gas flow source 400 may be coupled directly to an interior of the ducts 414 using one or more brackets (not shown) to fix the energy recovery system 100 therein.

Figure 6:
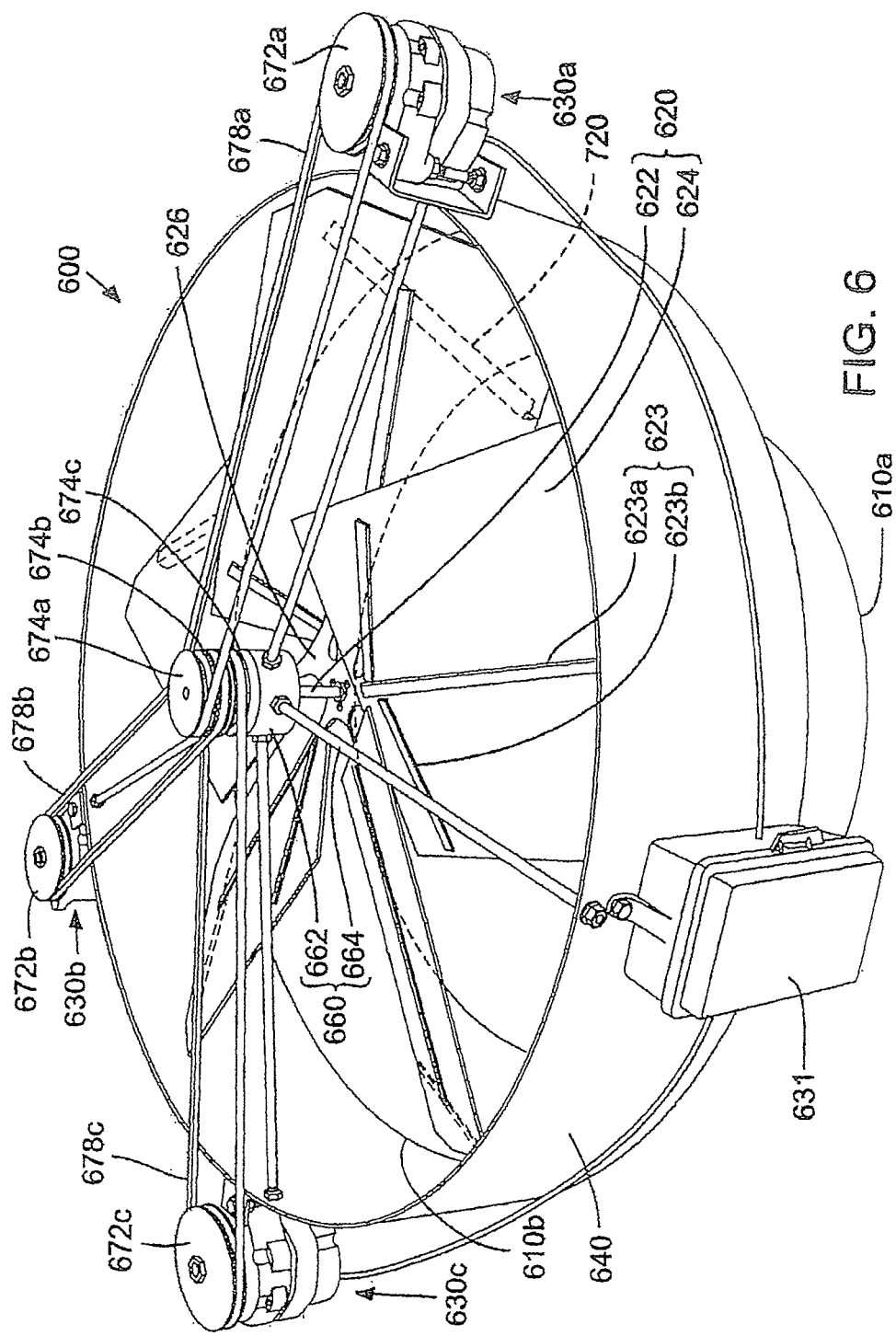
FIG. 6 is a perspective schematic view generally showing an upper portion of an energy recovery system according to a second embodiment.
Figure 7:
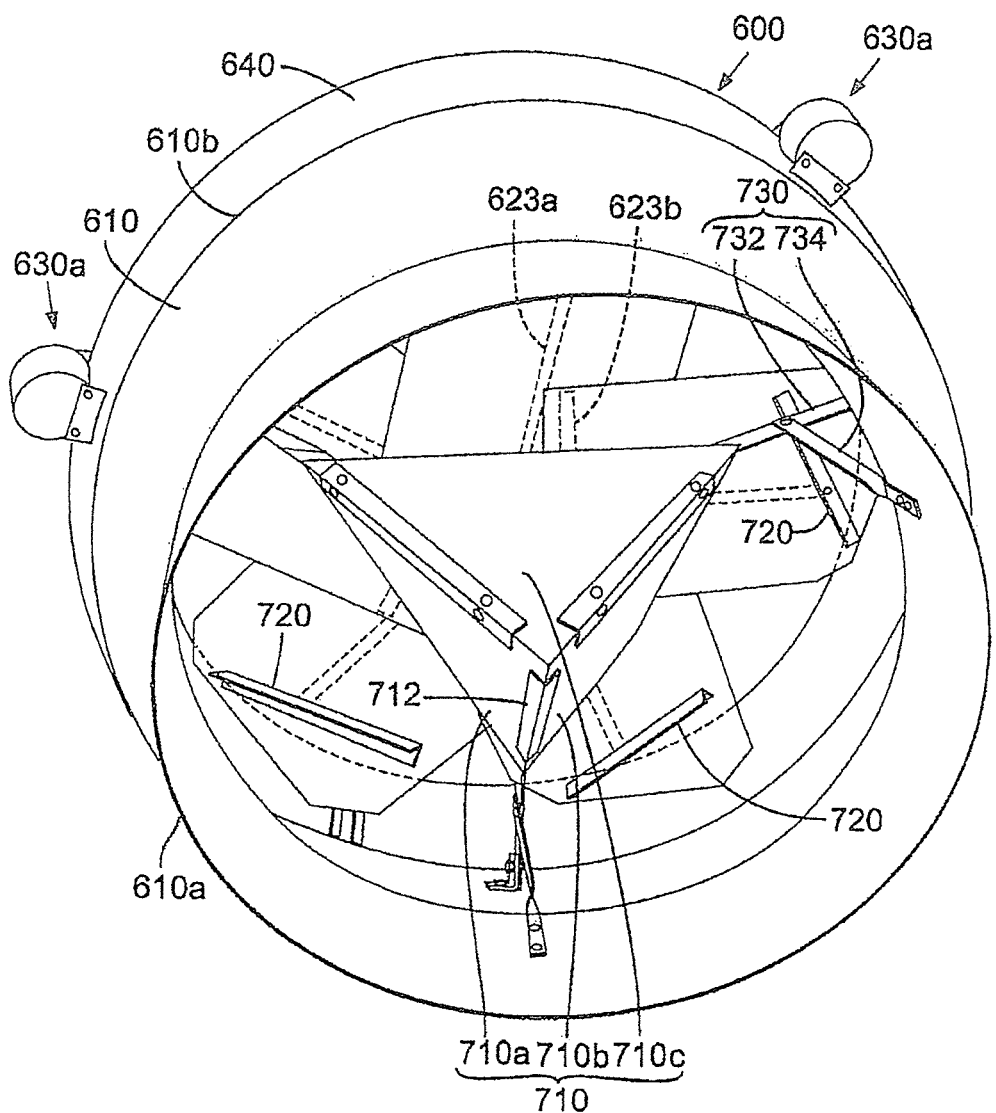
FIG. 7 is a perspective schematic view generally showing a lower portion of the energy recovery system shown in FIG. 6.

FIG. 6 is a perspective schematic view generally showing an upper portion of an energy recovery system according to a second embodiment. FIG. 7 is a perspective schematic view generally showing a lower portion of the energy recovery system shown in FIG. 6.

Referring to FIGS. 6 and 7, an energy recovery system 600 may be generally characterized as including a conduit 610, a blade assembly 620 and electrical generators 630a, 630b and 630c.

Similar to the conduit 110, the conduit 610 may include a first end 610a and a second end 610b. The first end 610a may be configured to receive at least a portion of a gas flow generated by a gas flow source such as gas flow source 400. Further, the conduit 610 may be generally configured to transmit the received gas flow from the first end 610a toward the second end 610b.

According to the second embodiment, the conduit 610 is configured to diffuse gas transmitted from the first end 610a of the conduit 610. To diffuse the gas, the conduit 610 may, for example, be configured such that the second end 610b thereof is wider than the first end 610a thereof. As a result, gas received at the first end 610a of the conduit 610 can be diffused as it is transmitted from the first end 610a toward the second end 610b.

Similar to the first blade assembly 120, the blade assembly 620 is coupled to the conduit 610. The blade assembly 620 may be configured to be moved when the received gas flow is transmitted from the first end 610a of the conduit 610. The blade assembly 620 may, for example, include a rotatable shaft 622 and a plurality of blades 624 coupled to the rotatable shaft 622. The plurality of blades 624 may be configured to be moved in a predetermined direction (e.g., rotation in a clockwise direction, as shown in FIG. 6) when the received gas flow is transmitted from the first end 610a of the conduit 610. When the plurality of blades 624 move, the rotatable shaft 622 moves in the predetermined direction. In one embodiment, the plurality of blades 624 may consist of five blades. In one embodiment, each of the plurality of blades 624 may be coupled to the rotatable shaft 622 via a corresponding blade connection member 626. Accordingly, each blade connection member 626 may fix a corresponding one of the blades 624 at a predetermined pitch angle, $\Phi_1$, measured from a direction perpendicular to a longitudinal axis of the rotatable shaft 622.

In one embodiment, a reinforcing member 623 may be coupled to the back of each of the blades 624 to add structural support to the blades 624. Each reinforcing member 623 may, for example, include a first reinforcing member 623a extending in a longitudinal direction of a corresponding blade 624 and a plurality of second reinforcing members 623b extending in a generally transverse or oblique direction relative to the longitudinal direction.

The electrical generators 630a, 630b and 630c may be coupled to the blade assembly 620. The electrical generators 630a, 630b and 630c are configured to generate electricity when the blade assembly 620 moves. In one embodiment, each of the electrical generators 630a, 630b and 630c is configured to generate a different power output when the blade assembly 620 moves. An output of each of the electrical generators 630a, 630b and 630c may be connected to an output terminal 631, where power generated by the electrical generators 630a, 630b and 630c is combined into a single power output.

In one embodiment, the energy recovery system 100 may further include an additional blade assembly, similar to second blade assembly 150, adjacent to the blade assembly 620 and coupled to the electrical generators 630a, 630b and 630c. Such an additional blade assembly may be configured to be moved when the gas received at the first end 610a of the conduit 610 is transmitted beyond the blade assembly 620.

The energy recovery system 600 may further include a shroud member 640. The shroud member 640 may be coupled to the second end 610b of the conduit 610. The blade assembly 620 may be disposed within the shroud member 640. As exemplarily shown in FIGS. 6 and 7, the electrical generators 630a, 630b and 630c may be disposed outside the shroud member 640. In one embodiment, the electrical generators 630a, 630b and 630c may be substantially equidistant from each other along the perimeter of the shroud member 640.

As best shown in FIG. 7, the energy recovery system 600 may further include a baffle member 710 and vanes 720. The baffle member 710 is disposed between the first end 610a of the conduit 610 and the blade assembly 620 and is configured to deflect gas transmitted from the first end 610a of the conduit 610. In one embodiment, the baffle member 710 includes three triangular baffle plates 710a, 710b, and 710c coupled together via connection members 712 to form a pyramid. In one embodiment, the baffle member 710 may be fixed between the first end 610a of the conduit 610 and the blade assembly 620 by a baffle connection member 730. As exemplarily illustrated, the baffle connection member 730 includes a plurality of radial connection members 732. Each of the radial connection members 732 includes a first end and a second end opposite the first end. The first end of each radial connection member 732 is coupled to an inner wall of the conduit 610 and the second end of each radial connection member 732 is coupled to the baffle member 710. The radial connection members 732 are sufficiently rigid to prevent undesirable movement of the baffle member 710 when the blade assembly 620 moves. Support members 734 may be coupled between an intermediate point of respective radial connection members 732 and the conduit 610 to ensure structural rigidity of the baffle member 710. Each of the vanes 720 is coupled to a corresponding one of the blades 624 and may be configured to receive the gas that was deflected by the baffle member 710. Upon receiving the deflected gas, the vanes 720 may facilitate movement of the blades 624 in the predetermined direction.

As exemplarily illustrated in FIGS. 6 and 7, the shroud member 640 is provided as a single, integral component. Although not shown, one or more air intake ports may be provided to extend through the shroud member 640 to transmit ambient gas toward the blade assembly 620 (e.g., to the face of the blades 624), thereby facilitating movement of the blades 624 in the predetermined direction. In another embodiment, the shroud member 640 may be provided as a plurality of separate components coupled together in a manner that defines an air intake port, such as air intake port 142, capable of transmitting ambient gas toward the blade assembly 620.

As mentioned above, the blade assembly 620 may be disposed within the shroud member 640. In one embodiment, the blade assembly 620 may be fixed to the shroud member 640 by a blade assembly connection member 660. As exemplarily illustrated, the blade assembly connection member 660 includes an axial connection member 662 and a plurality of radial connection members 664. The axial connection member 662 (e.g., a drive shaft) is coupled to rotatable shaft 622 and fixes the rotatable shaft 622 in alignment with a longitudinal axis of the conduit 610. Each of the plurality of radial connection members 664 includes a first end and a second end opposite the first end. The first end of each radial connection member 664 is coupled to the shroud member 640 and the second end of each radial connection member 664 is coupled to the axial connection member 662. The radial connection members 664 are sufficiently rigid to prevent undesirable movement of the axial connection member 662 when the blade assembly 620 moves.

As mentioned above, the electrical generators 630a, 630b and 630c may be coupled to the blade assembly 620 and be configured to generate electricity when the blade assembly 620 moves. In one embodiment, the electrical generators 630a, 630b and 630c may be coupled to the blade assembly 620 via a belt and pulley system 670. The belt and pulley system 670 may, for example, include first pulleys 672a, 672b and 672c coupled to the electrical generators 630a, 630b and 630c, respectively, second pulleys 674a, 674b and 674c coupled to the rotatable shaft 622. In one embodiment, the second pulleys 674a, 674b and 674c may be coupled to the rotatable shaft 622. The first pulleys 672a, 672b and 672c and the second pulleys 674a, 674b and 674c are connected to each other by belts 678a, 678b and 678c, respectively.

Although the electrical generators 630a, 630b and 630c are described above as being coupled to the blade assembly 620 by a belt and pulley system 670, it will be appreciated that one or more of the electrical generators 630a, 630b and 630c may be coupled to the blade assembly 620 by any suitable means. For example, one or more of the electrical generators 630a, 630b and 630c may be coupled to the blade assembly 620 directly (e.g., as a direct-drive system), by gears, or the like.

In one embodiment, the electrical generators 630a, 630b and 630c may be coupled to the shroud member 640 via mounting brackets 632a, 632b and 632c, respectively, fixed to the shroud member 640. In another embodiment, however, the electrical generators 630a, 630b and 630c may be coupled to the shroud member 640 via respective support trays similar to support tray 132.

To convert the kinetic energy of a gas flow into electricity, the energy recovery system 600 may be disposed so that the first end 610a of the conduit 610 receives a portion of a gas flow generated by a gas flow source. The received gas flow is then transmitted from the first end 610a of the conduit 610 toward the second end 610b of the conduit 610. When transmitted from the first end 610a of the conduit 610, the received gas flow acts upon the blade assembly 620. Also, when the received gas flow is transmitted toward the second end 610b of the conduit 610, the gas becomes diffused because the second end 610b of the conduit 610 is wider than the first end 610a of the conduit 610. Thus, a pressure of the gas at the second end 610b of the conduit 610 is lower than a pressure of the gas at the first end 610a of the conduit 610. When the blade assembly 620 is acted upon by the low-pressure gas within the received gas flow, the plurality of blades 624 move in a predetermined direction (e.g., rotate in a clockwise direction about an axis that is substantially parallel with the longitudinal axis of the conduit 610). Gas within the gas flow is then released into the ambient environment and/or the gas flow channel of the gas flow source (e.g., gas flow source 400) via the shroud member 640. Thus, transmitted beyond the blade assembly 620 is released into the ambient environment and/or the gas flow channel of the gas flow source (e.g., gas flow source 400) via the shroud member 640. Movement of the plurality of blades 624 causes corresponding movement of the rotatable shaft 622 which, in turn, causes corresponding movement of the second pulleys 674a, 674b and 674c. Movement of the second pulleys 674a, 674b and 674c is translated into movement of the first pulleys 672a, 672b and 672c by corresponding ones of the belts 678a, 678b and 678c. When the first pulleys 672a, 672b and 672c move, the electrical generators 630a, 630b and 630c generate electricity. Thus, the electrical generators 630a, 630b and 630c are configured to generate electricity when the blade assembly 620 moves.

In embodiments where the energy recovery system 600 includes the baffle member 710 and vanes 720, the gas received at the first end 610a of the conduit may also be deflected by the baffle member 710 to act upon the vanes 720. When the vanes 720 are acted upon by the gas deflected by the baffle member 710, the vanes 720 facilitate movement of the blades 624 in the predetermined direction which, in turn, causes corresponding movement of the rotatable shaft 622 and the second pulleys 674a, 674b and 674c. When the first pulleys 672a, 672b and 672c move, the electrical generators 630a, 630b and 630c generate electricity.

Constructed as exemplarily described above, the energy recovery system 600 may be disposed relative to a gas flow source, such as gas flow source 400, as exemplarily described with respect to any of FIGS. 4A-4C. Moreover, the cross-sectional area of the first end 610a of the conduit 610 may be less than the cross-sectional area of a gas flow channel, equal to the cross-sectional area of the gas flow channel, or greater than the cross-sectional area of the gas flow channel. It will be appreciated that, in some cases, the ability of the energy recovery system 600 to generate electricity while preventing undesirable generation of back pressure within the gas flow source 400 may be dependent upon the cross-sectional area of the second end 610b of the conduit 610. Thus, given a sufficiently large cross-sectional area of the second end 610b of the conduit 610, the energy recovery system 600 may be coupled to the exterior of the air handling unit 405 such that a distance D between the first end 610a of conduit 610 and the exhaust area 410 is effectively zero.

Figure 8:
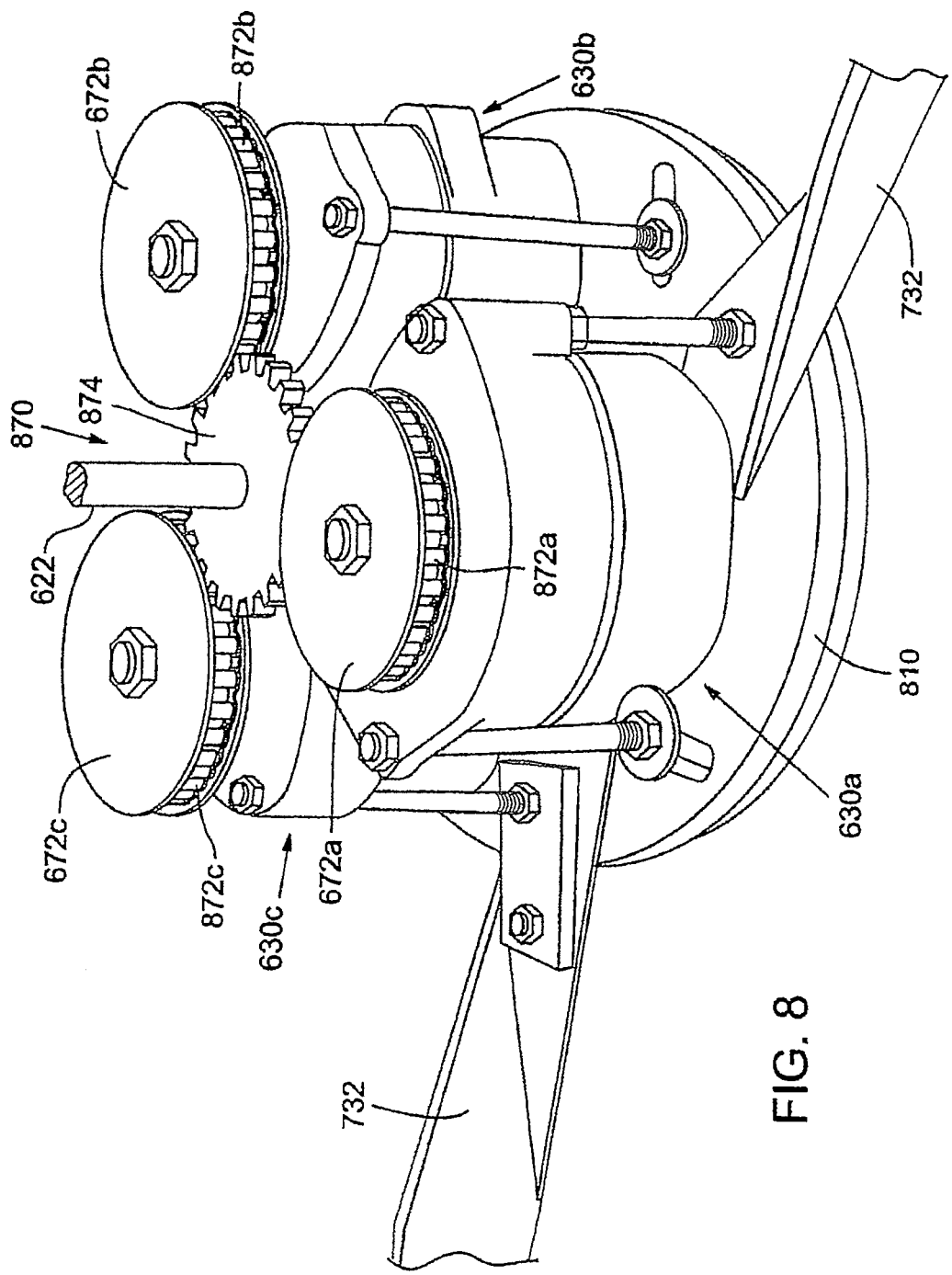
FIG. 8 is a perspective schematic view of electrical generators that may be coupled to a blade assembly of the energy recovery system shown in FIGS. 6 and 7.

FIG. 8 is a perspective schematic view of electrical generators that may be coupled to a blade assembly of the energy recovery system shown in FIGS. 6 and 7.

Referring to the electrical generators 630a, 630b and 630c shown in FIGS. 6 and 7 may be disposed within the shroud member 640 and be coupled to the blade assembly 620 via a sprocket and chain system 870. The sprocket and chain system 870 may include the aforementioned first pulleys 672a, 672b and 672c in addition to chains 872a, 872b and 872c and sprocket 874. Chains 872a, 872b and 872c may be disposed within grooves of first pulleys 672a, 672b and 672c, respectively. The sprocket 874 may be coupled to the rotatable shaft 622 and be configured to engage with the chains 872a, 872b and 872c. The electrical generators 630a, 630b and 630c may be coupled to an electrical generator support member 810. The electrical generator support member 810 may be fixed between the first end 610a of the conduit 610 and the blade assembly 620 by the aforementioned radial connection members 732. Accordingly, the electrical generator support member 810 shown in FIG. 8 may be covered by the baffle member 710.

Figure 9:
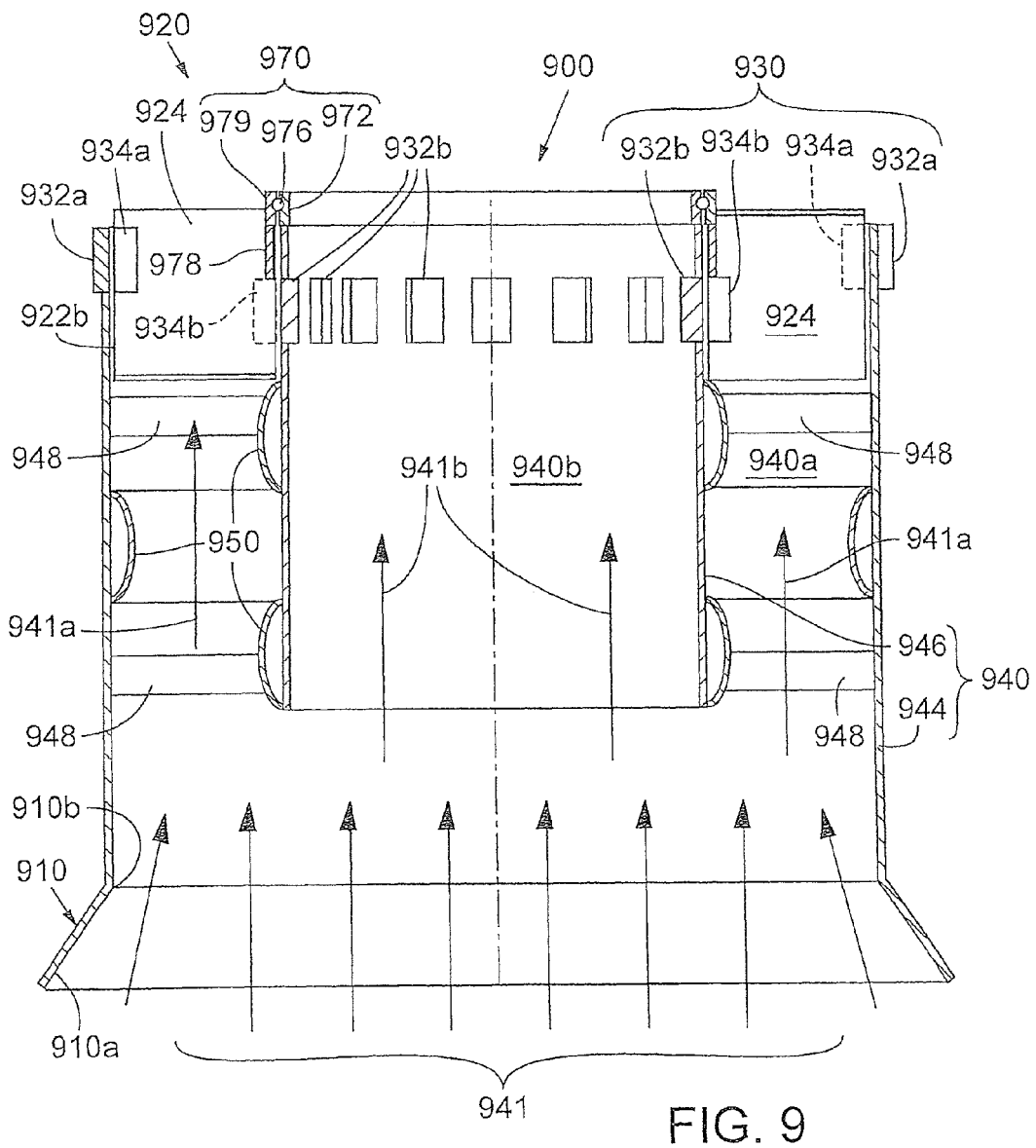
FIG. 9 is a cross-sectional view of an energy recovery system shown according to a third embodiment.
Figure 10:
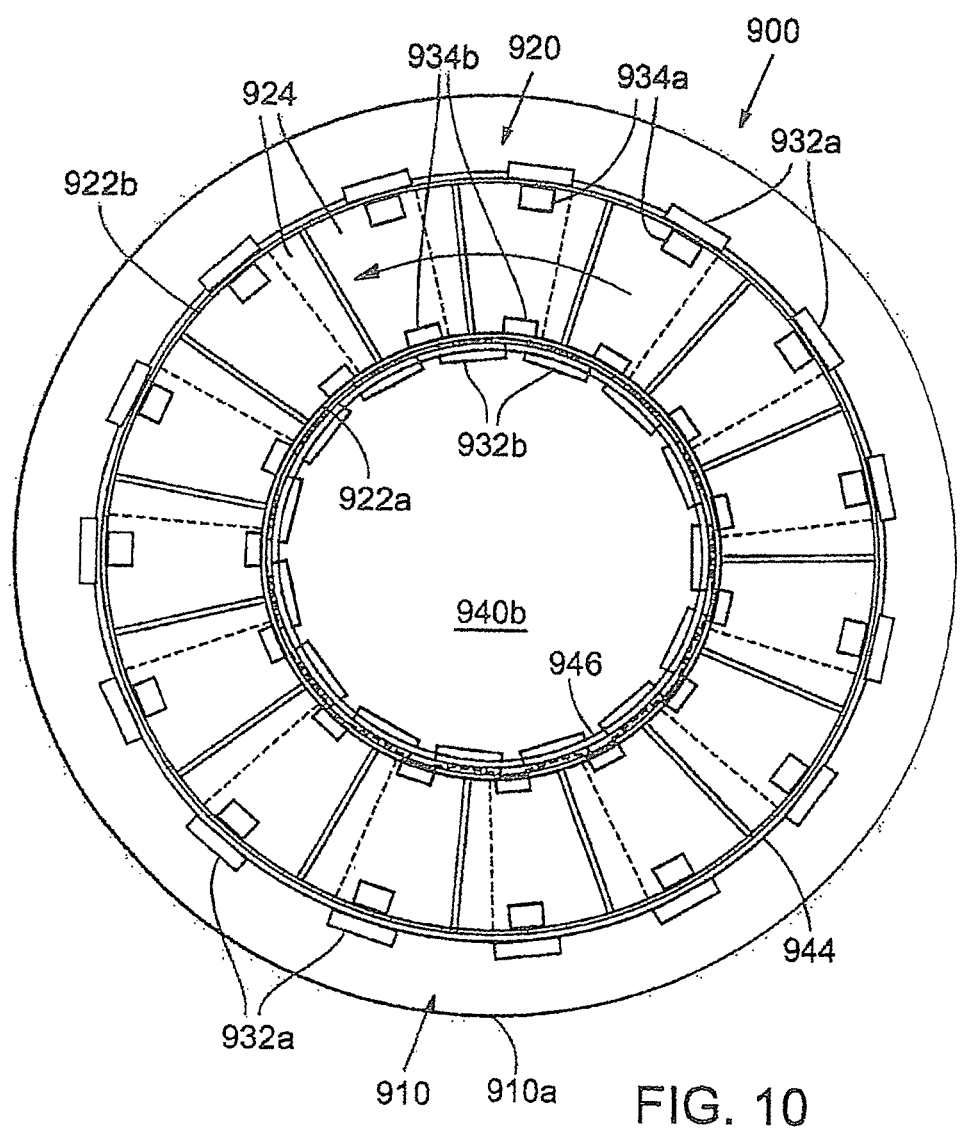
FIG. 10 is a top view of the energy recovery system shown in FIG. 9.

FIG. 9 is a cross-sectional view of an energy recovery system shown according to a third embodiment. FIG. 10 is a top view of the energy recovery system shown in FIG. 9.

Referring to FIGS. 9 and 10, an energy recovery system 900 may be generally characterized as including a conduit 910, a blade assembly 920 and an electrical generator 930.

Similar to the conduit 110, the conduit 910 may include a first end 910a and a second end 910b. The first end 910a may be configured to receive at least a portion of a gas flow generated by a gas flow source such as gas flow source 400. Further, the conduit 910 may be generally configured to transmit the received gas flow from the first end 910a toward the second end 910b. Similar to the conduit 110, the conduit 910 is configured to compress gas transmitted from the first end 910a of the conduit 910.

The blade assembly 920 is coupled to the conduit 910 via a shroud member 940. The blade assembly 920 may be configured to be moved when the received gas flow is transmitted from the first end 910a of the conduit 910. The blade assembly 920 may, for example, include a plurality of blades 924 arranged in ring shape such that gas is allowed to pass between adjacent blades 924. Constructed as exemplarily described above, the plurality of blades 924 may define a generally annular structure when viewed from the top or bottom, wherein each blade 924 includes an inner edge 922a and an outer edge 922b. The plurality of blades 924 may be configured to be moved in a predetermined direction (e.g., rotation in a counter-clockwise direction, as shown in FIG. 10) when the received gas flow is transmitted from the first end 910a of the conduit 910.

The electrical generator 930 may be coupled to the blade assembly 920 and the shroud member 940. The electrical generator 930 is configured to generate electricity when the blade assembly 920 moves.

The shroud member 940 may be coupled to the second end 910b of the conduit 910. The shroud member 940 includes a first shroud body 944 and a second shroud body 946. The first shroud body 944 is coupled to the second end 910b of the conduit 910. The first shroud body 944 and the second shroud body 946 are coupled to each other via shroud body connection members 948. As a result, an annular transmission space 940a is defined between the first shroud body 944 and the second shroud body 946 and an exhaust space 940b is defined by the second shroud body 946.

The blade assembly 920 may be disposed between the first shroud body 944 and the second shroud body 946. Moreover, the blade assembly 920 is rotatable about the longitudinal axis of the shroud member 940. Accordingly, the blade assembly 920 may be coupled to the first shroud body 944 and/or the second shroud body 946 in any known manner permitting movement about the longitudinal axis of the shroud member 940 while preventing movement along the longitudinal axis of the shroud member 940. Accordingly, gas transmitted into the annular transmission space 940a is received by the blade assembly 920 and gas transmitted from the first end 910a of the conduit 910 into the exhaust space 940b can be released into the ambient environment.

As best shown in FIG. 9, the blade assembly 920 is coupled to the second shroud body 946 via a blade track assembly 970. The blade track assembly 970 may, for example, include a first bearing shell 972 coupled to the second shroud body 946, a second bearing shell 974 coupled to a collar 978 which, in turn is coupled to the inner edge 922a of each of the plurality of blades 924, and a plurality of bearings 976 received within a space defined by the first bearing shell 972 and the second bearing shell 974. Constructed as exemplarily described above, the blade track assembly 970 allows the blade assembly 920 to rotate about the longitudinal axis of the shroud member 940 with minimal losses due to friction.

As exemplarily illustrated in FIGS. 9 and 10, the first shroud body 944 is provided as a single, integral component. Although not shown, one or more air intake ports may be provided to extend through the first shroud body 944 as exemplarily described above to transmit ambient gas toward the blade assembly 920 (e.g., to the face of the blades 924), thereby facilitating movement of the blades 924 in the predetermined direction. In another embodiment, the first shroud body 944 may be provided as a plurality of separate components coupled together in a manner that defines an air intake port, such as air intake port 142, capable of transmitting ambient gas toward the blade assembly 920.

As exemplarily illustrated, the energy recovery system 900 may further include a plurality of gas flow deflection members 950 disposed on sidewalls of the annular transmission space 940a (i.e., on opposing surfaces of the first shroud body 944 and the second shroud body 946). The gas flow deflection members 950 act to compress gas transmitted into the annular transmission space 940a and to reduce any undesirable movement that the second shroud body 946 may experience as gas is transmitted from the first end 910a of the conduit 910.

As mentioned above, the electrical generator 130 may be coupled to the blade assembly 920 and be configured to generate electricity when the blade assembly 920 moves. In one embodiment, the electrical generator 930 may be coupled to the blade assembly 920 and the shroud member 940. For example, the electrical generator 930 may include a plurality of first stator elements 932a coupled to the first shroud body 944, a plurality of second stator elements 932b coupled to the second shroud body 946, a plurality of first rotor elements 934a coupled to the blade assembly 920 and a plurality of second rotor elements 934b coupled to the blade assembly 920. The plurality of first rotor elements 934a are coupled to the blade assembly 920 so as to be operably proximate to the plurality of first stator elements 932a when the blade assembly 920 moves. Similarly, the plurality of second rotor elements 934b are coupled to the blade assembly 920 so as to be operably proximate to the plurality of second stator elements 932b when the blade assembly 920 moves. When first rotor elements 934a and the second rotor elements 934b are operably proximate to the plurality of first stator elements 932a and the plurality of second stator elements 932b, respectively, during movement of the blade assembly 920, electricity is generated.

In one embodiment, the plurality of first stator elements 932a and the plurality of second stator elements 932b are each provided as a coil of electrically conducting material (e.g., copper wire) and the plurality of first rotor elements 934a and the plurality of second rotor elements 934b are each provided as a permanent magnet. As exemplarily illustrated, a first rotor element 934a and a second rotor element 934b are disposed adjacent to each of the blades 924. The plurality of first stator elements 932a are disposed to be operably proximate to every-other one of the plurality of first rotor elements 934a during movement of the blade assembly 920. The plurality of second stator elements 932b are disposed to be operably proximate to every-other one of the plurality of second rotor elements 934b during movement of the blade assembly 920. In addition, plurality of first stator elements 932a are offset from the second stator elements 932b such that only one of the first rotor element 934a or the second rotor element 934b disposed adjacent to each of the blades 924 is operably proximate to one of the first stator elements 932a and the second stator elements 932b, respectively, at any time during movement of the blade assembly 920. Operation of the plurality of first stator elements 932a and the plurality of second stator elements 932b may be coupled to a controller (not shown) that is configured to optimize generation of electricity, as is known in the art, by the electrical generator 930 during movement of the blade assembly 920.

To convert the kinetic energy of a gas flow into electricity, the energy recovery system 900 may be disposed so that the first end 910a of the conduit 910 receives a portion of a gas flow 941 generated by a gas flow source. The received gas flow is then transmitted from the first end 910a of the conduit 910 toward the second end 910b of the conduit 910. When transmitted from the first end 910a of the conduit 910, the first portion 941a of the received gas flow acts upon the blade assembly 920 while the second portion 941b flows through second shroud body 946. When the blade assembly 920 is acted upon by the first portion of the received gas flow, the plurality of blades 924 move in a predetermined direction (e.g., rotate in a counter-clockwise direction about an axis that is substantially parallel with the longitudinal axis of the conduit 910). Gas within the gas flow is then released into the ambient environment and/or the gas flow channel of the gas flow source (e.g., gas flow source 400) via the shroud member 940. Thus, gas transmitted beyond the blade assembly 920 is released into the ambient environment and/or the gas flow channel of the gas flow source (e.g., gas flow source 400) via the shroud member 940. Movement of the plurality of blades 924 causes relative movement between the plurality of first stator elements 932a and the plurality of first rotor elements 934a, and between the plurality of second stator elements 932a and the plurality of second rotor elements 934b, thereby causing the generation of electricity by the electrical generator 930. Thus, the electrical generator 930 is configured to generate electricity when the blade assembly 920 moves.

Constructed as exemplarily described above, the energy recovery system 900 may be disposed relative to a gas flow source, such as gas flow source 400, as exemplarily described with respect to any of FIGS. 4A-4C. Moreover, the cross-sectional area of the first end 910a of the conduit 910 may be less than the cross-sectional area of a gas flow channel, equal to the cross-sectional area of the gas flow channel, or greater than the cross-sectional area of the gas flow channel. It will be appreciated that, in some cases, the ability of the energy recovery system 900 to generate electricity while preventing undesirable generation of back pressure within the gas flow source 400 may be dependent upon the width of the annular transmission space 940a (i.e., the distance between the first shroud body 944 and the second shroud body 946) transmitting the first gas flow portion 941a and/or the width of the exhaust space 940b allowing the second gas flow portion 941b to bypass the blade assembly. In one embodiment, the width of the annular transmission space 940a may be as small as 1 inch. In one embodiment, the energy recovery system 900 may be coupled to the exterior of the air handling unit 405 such that a distance D between the first end 910a of conduit 910 (or between the shroud member 940) and the exhaust area 410 is effectively zero.

In one embodiment, the conduit 910 as described above may be omitted. In such an embodiment, shroud member 940 may function as the conduit 910 receiving the gas flow generated by the gas flow source 400 and transmitting the received gas flow to blade assembly 920. In embodiments where the energy recovery unit 900 is configured to generate electricity using a gas flow transmitted by a duct 414, a portion of the duct 414 may function as the first shroud body 944.

Figure 11:
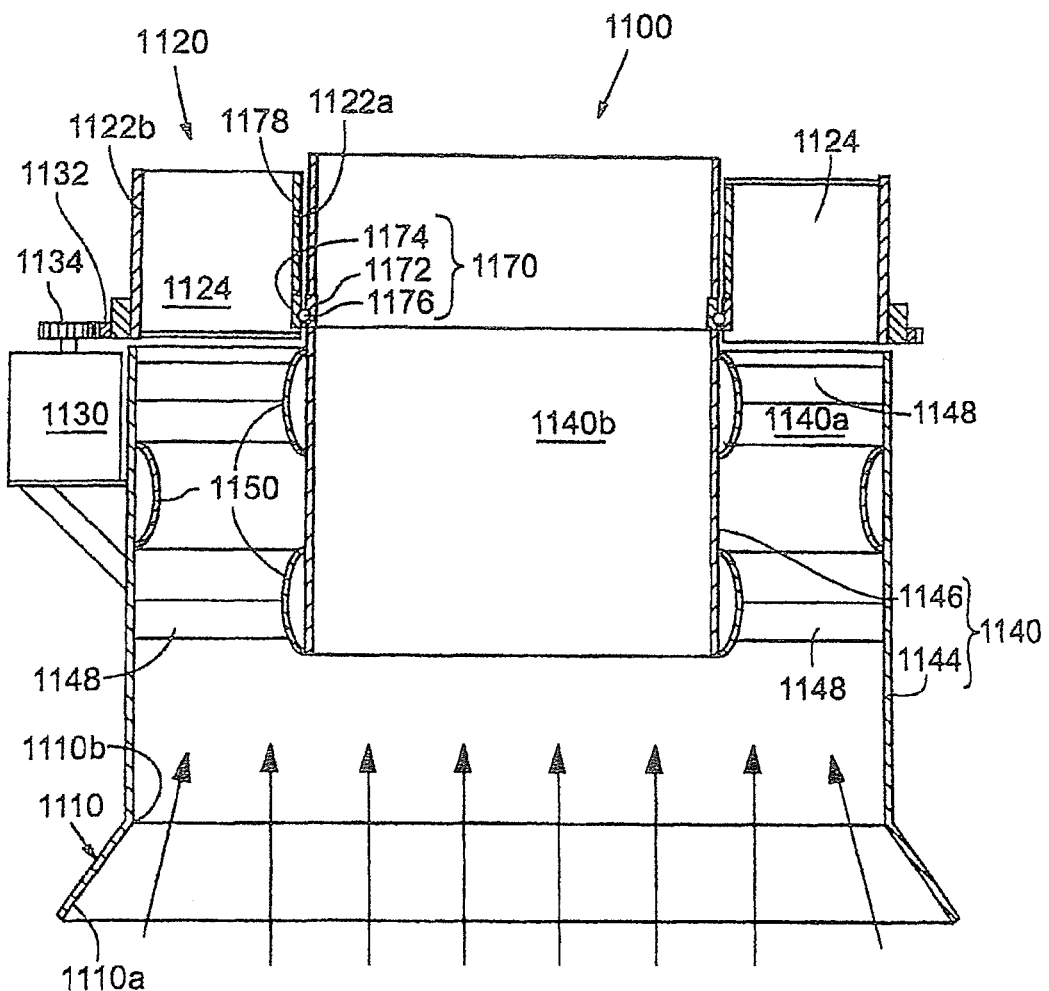
FIG. 11 is a side view of the energy recovery system according to a fourth embodiment.
Figure 12:
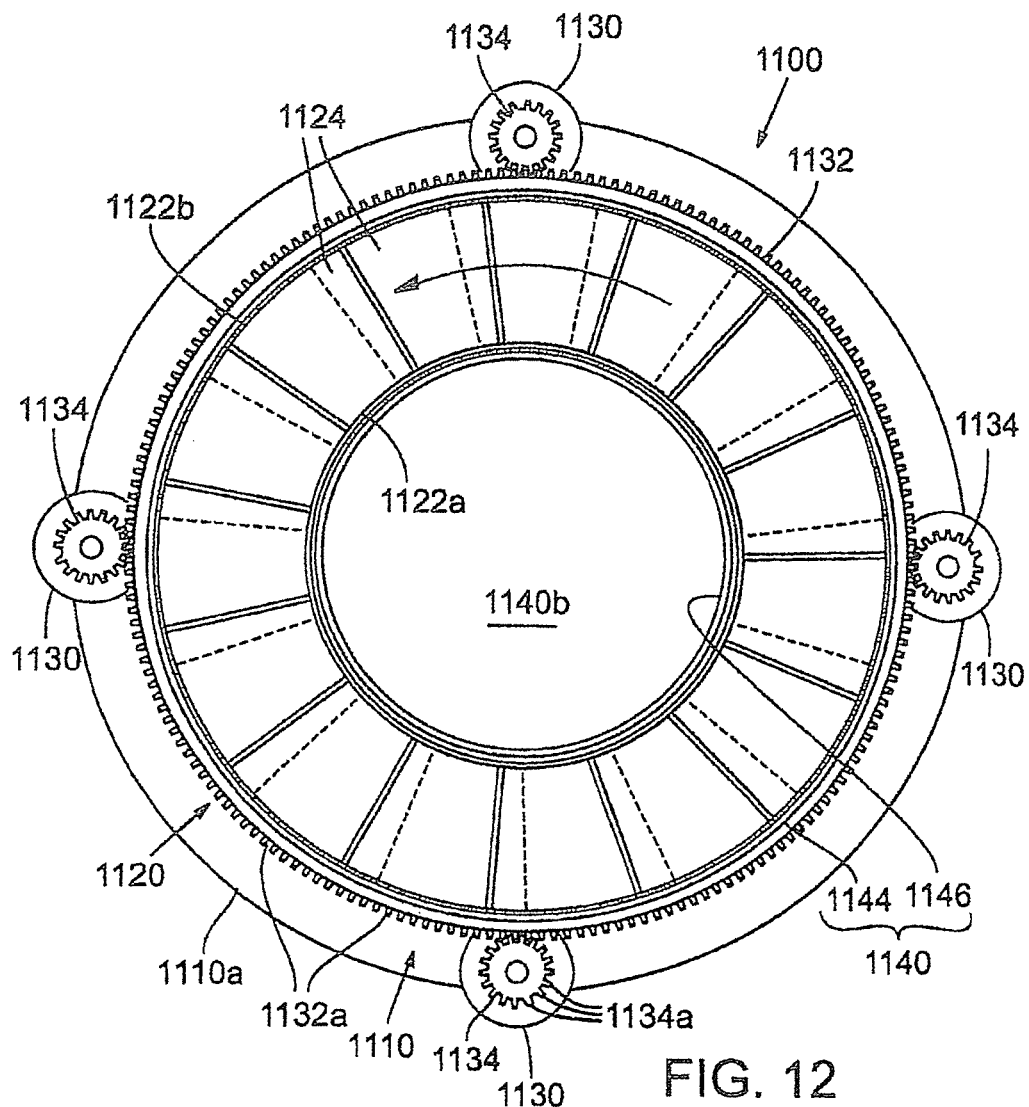
FIG. 12 is a top view of the energy recovery system shown in FIG. 11.

FIG. 11 is a side view of the energy recovery system according to a fourth embodiment. FIG. 12 is a top view of the energy recovery system shown in FIG. 11.

Referring to FIGS. 11 and 12, an energy recovery system 1100 may be generally characterized as including a conduit 1110, a blade assembly 1120 and an electrical generator 1130.

Similar to the conduit 910, the conduit 1110 may include a first end 1110a and a second end 1110b. The first end 1110a may be configured to receive at least a portion of a gas flow generated by a gas flow source such as gas flow source 400. Further, the conduit 1110 may be generally configured to transmit the received gas flow from the first end 1110a toward the second end 1110b. Similar to the conduit 910, the conduit 1110 is configured to compress gas transmitted from the first end 1110a of the conduit 1110.

The blade assembly 1120 is coupled to the conduit 1110 via a shroud member 1140. Similar to the blade assembly 920, the blade assembly 1120 may, for example, include a plurality of blades 1124 arranged in ring shape such that gas is allowed to pass between adjacent blades 1124. Constructed as exemplarily described above, the plurality of blades 1124 may define a generally annular structure when viewed from the top or bottom, wherein each blade 1124 includes an inner edge 1122a and an outer edge 1122b. The plurality of blades 1124 may be configured to be moved in a predetermined direction (e.g., rotation in a counter-clockwise direction, as shown in FIG. 12) when the received gas flow is transmitted from the first end 1110a of the conduit 1110.

The electrical generator 1130 may be coupled to the blade assembly 1120. The electrical generator 1130 is configured to generate electricity when the blade assembly 1120 moves.

Similar to the shroud member 940, the shroud member 1140 may be coupled to the second end 1110b of the conduit 1110. The shroud member 1140 includes a first shroud body 1144 and a second shroud body 1146. The first shroud body 1144 is coupled to the second end 1110b of the conduit 1110. The first shroud body 1144 and the second shroud body 1146 are coupled to each other via shroud body connection members 1148. As a result, an annular transmission space 1140a is defined between the first shroud body 1144 and the second shroud body 1146 and an exhaust space 1140b is defined by the second shroud body 1146.

The blade assembly 1120 may be disposed on the first shroud body 1144 and the second shroud body 1146. Moreover, the blade assembly 1120 is rotatable about the longitudinal axis of the shroud member 1140. Accordingly, the blade assembly 1120 may be coupled to the first shroud body 1144 and/or the second shroud body 1146 in any known manner permitting movement about the longitudinal axis of the shroud member 1140. Gas transmitted into the annular transmission space 1140a is received by the blade assembly 1120 and gas transmitted from the first end 1110a of the conduit 1110 into the exhaust space 1140b can be released into the ambient environment.

As best shown in FIG. 11, the blade assembly 1120 is coupled to the second shroud body 1146 via a blade track assembly 1170. The blade track assembly 1170 may, for example, include a first bearing shell 1172 coupled to the second shroud body 1146, a second bearing shell 1174 coupled to a collar 1178 which, in turn is coupled to the inner edge 1122a of each of the plurality of blades 1124, and a plurality of bearings 1176 received within a space defined by the first bearing shell 172 and the second bearing shell 1174. Constructed as exemplarily described above, the blade track assembly 1170 allows the blade assembly 1120 to rotate about the longitudinal axis of the shroud member 1140 with minimal losses due to friction.

As exemplarily illustrated in FIG. 11, the first shroud body 1144 is provided as a single, integral component. Although not shown, one or more air intake ports may be provided to extend through the first shroud body 1144 as exemplarily described above to transmit ambient gas toward the blade assembly 1120 (e.g., to the face of the blades 1124), thereby facilitating movement of the blades 1124 in the predetermined direction. In another embodiment, the first shroud body 1144 may be provided as a plurality of separate components coupled together in a manner that defines an air intake port, such as air intake port 142, capable of transmitting ambient gas toward the blade assembly 1120.

Similar to the energy recovery system 900, the energy recovery system 1100 may further include a plurality of gas flow deflection members 1150 disposed on sidewalls of the annular transmission space 1140a (i.e., on opposing surfaces of the first shroud body 1144 and the second shroud body 1146). The gas flow deflection members 1150 act to compress the gas transmitted into the annular transmission space 1140a and to reduce any undesirable movement that the second shroud body 1146 may experience as gas is transmitted from the first end 1110a of the conduit 1110.

As mentioned above, the electrical generator 130 may be coupled to the blade assembly 1120 and be configured to generate electricity when the blade assembly 1120 moves. In one embodiment, the electrical generator 1130 may be coupled to the blade assembly 1120 by ring gear 1132 fixed to and extending around the outer circumference of the blade assembly 1120 and a planetary gear 1134 engaged with the ring gear 1132 and fixed to the electrical generator 1130. In one embodiment, teeth 1134a of the planetary gear 1134 may engage with teeth 1132a of the ring gear 1132. Although the energy recovery system 1100 is described above as including a single electrical generator 1130, it will be appreciated that the energy recovery system 1100 may include a plurality of electrical generators 1130 coupled to the blade assembly 1120 via a corresponding plurality of planetary gears 1134, as exemplarily shown in FIG. 12. Each of the electrical generators 1130 may be configured to generate the same or a different power output when the blade assembly 1120 moves.

To convert the kinetic energy of a gas flow into electricity, the energy recovery system 1100 may be disposed so that the first end 1110a of the conduit 1110 receives a portion of a gas flow generated by a gas flow source. The received gas flow is then transmitted from the first end 1110*a* of the conduit 1110 toward the second end 1110*b* of the conduit 1110. When transmitted from the first end 1110*a* of the conduit 1110, the received gas flow acts upon the blade assembly 1120. When the blade assembly 1120 is acted upon by the received gas flow, the plurality of blades 1124 move in a predetermined direction (e.g., rotate in a counter-clockwise direction about an axis that is substantially parallel with the longitudinal axis of the conduit 1110). Gas within the gas flow is then released into the ambient environment and/or the gas flow channel of the gas flow source (e.g., gas flow source 400) via the shroud member 1140. Thus, gas transmitted beyond the blade assembly 1120 is released into the ambient environment and/or the gas flow channel of the gas flow source (e.g., gas flow source 400) via the shroud member 1140. Movement of the plurality of blades 1124 causes movement of the ring gear 1132 which, in turn, causes movement of the one or more planetary gears 1134, thereby causing the generation of electricity by the one or more electrical generators 1130. Thus, the electrical generator 1130 is configured to generate electricity when the blade assembly 1120 moves.

Constructed as exemplarily described above, the energy recovery system 1100 may be disposed relative to a gas flow source, such as gas flow source 400, as exemplarily described with respect to any of FIGS. 4A-4C. Moreover, the cross-sectional area of the first end 1110*a* of the conduit 1110 may be less than the cross-sectional area of a gas flow channel, equal to the cross-sectional area of the gas flow channel, or greater than the cross-sectional area of the gas flow channel. It will be appreciated that, in some cases, the ability of the energy recovery system 1100 to generate electricity while preventing undesirable generation of back pressure within the gas flow source 400 may be dependent upon the width of the annular transmission space 1140*a* (i.e., the distance between the first shroud body 1144 and the second shroud body 1146) and/or the width of the exhaust space 1140*b*. In one embodiment, the width of the annular transmission space 1140*a* may be as small as 1 inch. In one embodiment, the energy recovery system 1100 may be coupled to the exterior of the air handling unit 405 such that a distance D between the first end 1110*a* of conduit 1110 (or between the shroud member 1140) and the exhaust area 410 is effectively zero.

In one embodiment, the conduit 1110 as described above may be omitted. In such an embodiment, shroud member 1140 may function as the conduit 1110 receiving the gas flow generated by the gas flow source 400 and transmitting the received gas flow to blade assembly 1120. In embodiments where the energy recovery unit 1100 is configured to generate electricity using a gas flow transmitted by a duct 414, a portion of the duct 414 may function as the first shroud body 1144.

Figure 13:
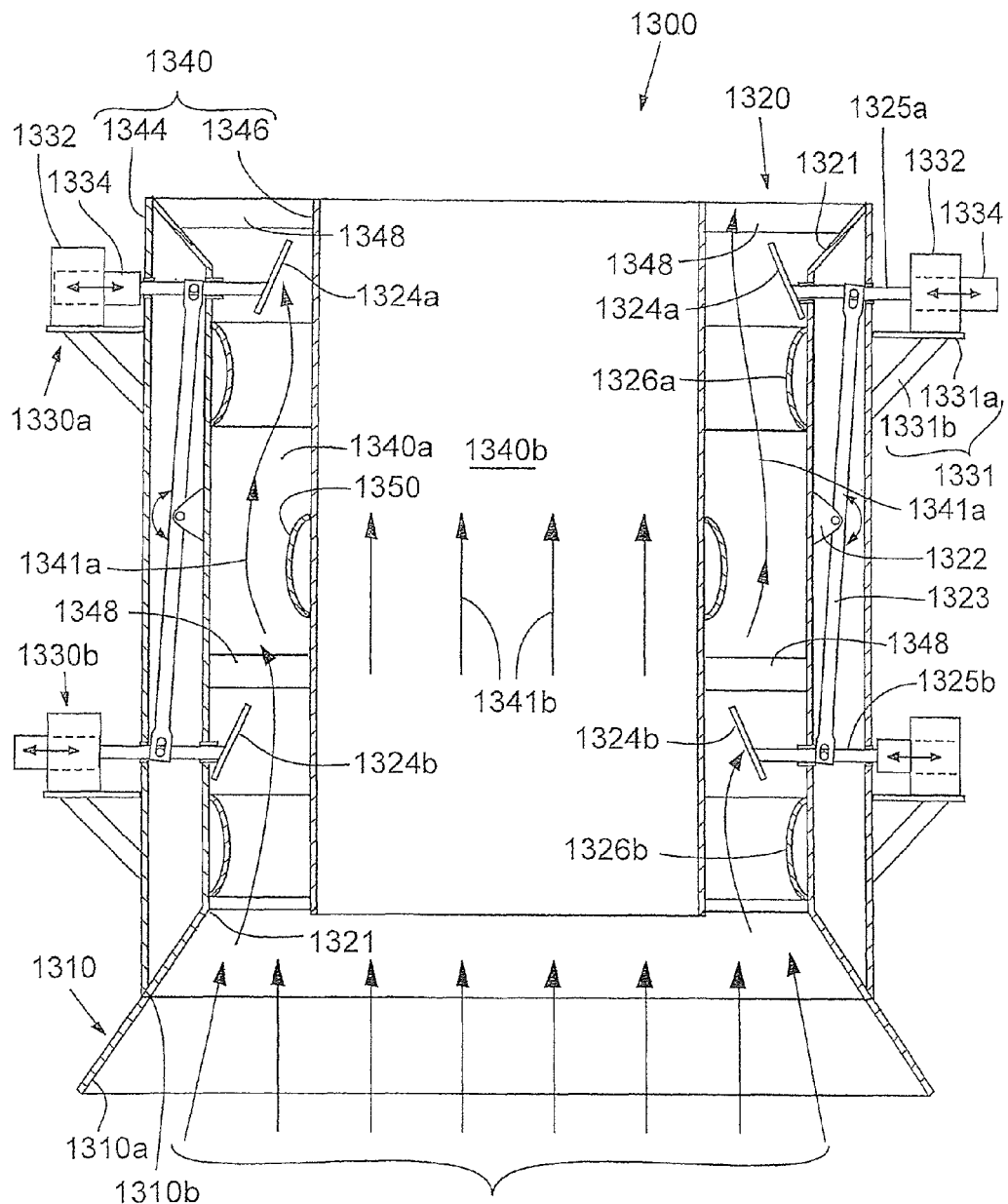
FIG. 13 is a cross-sectional view of an energy recovery system according to a fifth embodiment.
Figure 14:
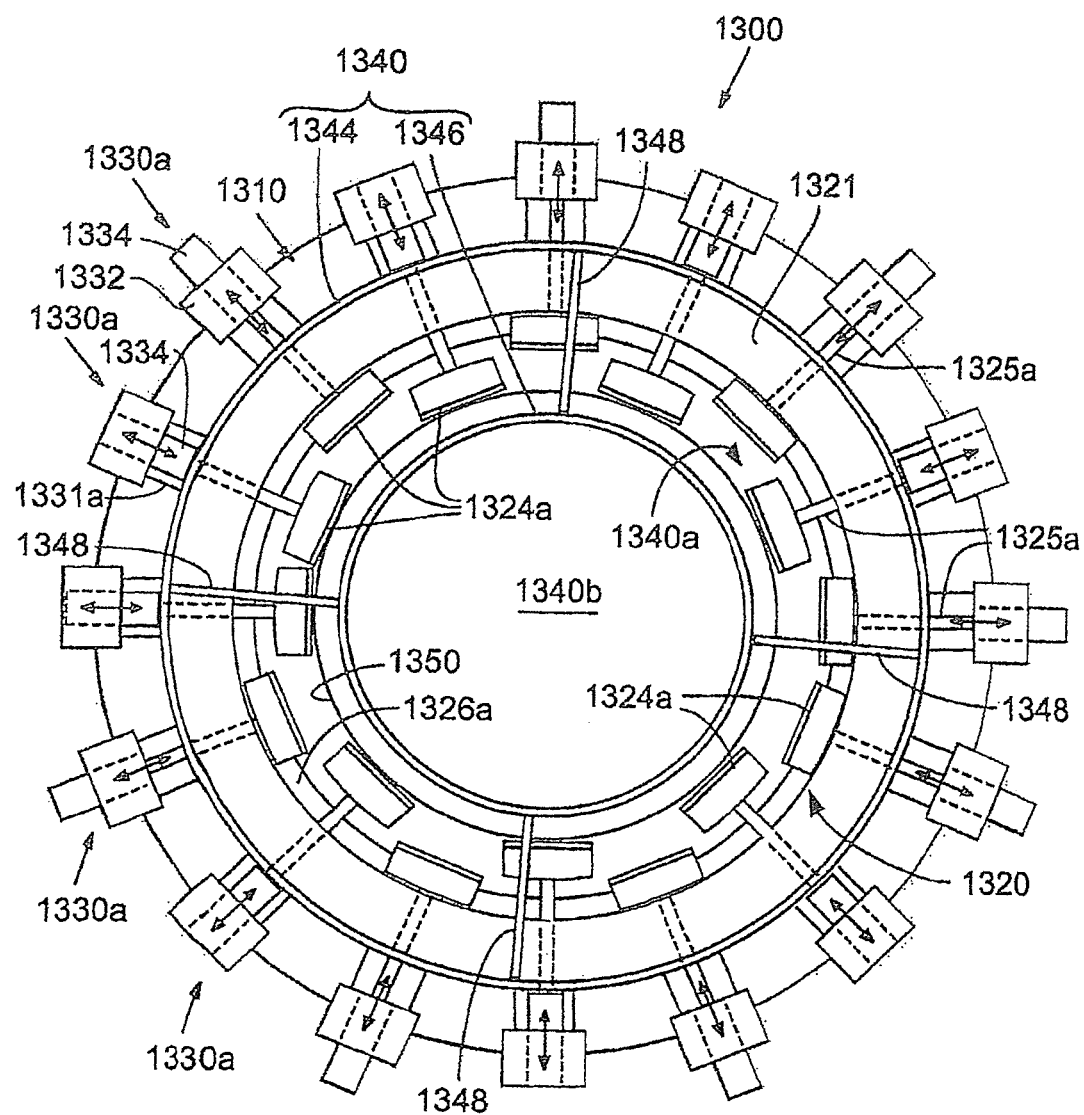
FIG. 14 is a top view of the energy recovery system shown in FIG. 13.

FIG. 13 is a cross-sectional view of an energy recovery system according to a fifth embodiment. FIG. 14 is a top view of the energy recovery system shown in FIG. 13.

Referring to FIGS. 13 and 14, an energy recovery system 1300 may be generally characterized as including a conduit 1310, a plurality of blade assemblies 1320, a plurality of electrical generators 1330*a* and a plurality of electrical generators 1330*b*.

Similar to the conduit 1110, the conduit 1310 may include a first end 1310*a* and a second end 1310*b*. The first end 1310*a* may be configured to receive at least a portion of a gas flow generated by a gas flow source such as gas flow source 400. Further, the conduit 1310 may be generally configured to transmit the received gas flow from the first end 1310*a* toward the second end 1310*b*. Similar to the conduit 1110, the conduit 1310 is configured to compress gas transmitted from the first end 1310*a* of the conduit 1310.

Each blade assembly 1320 is coupled to the conduit 1310 via a shroud member 1340. Similar to the shroud member 1140, the shroud member 1340 may be coupled to the second end 1310*b* of the conduit 1310. The shroud member 1340 includes a first shroud body 1344 and a second shroud body 1346. The first shroud body 1344 is coupled to the second end 1310*b* of the conduit 1310. The first shroud body 1344 and the second shroud body 1346 are coupled to each other via shroud body connection members 1348. The shroud body connection members 1348 may be connected between the first shroud body 1344 (and/or the blade assemblies 1320) and the second shroud body 1346. As a result, an annular transmission space 1340*a* is defined between the first shroud body 1344 and the second shroud body 1346 and an exhaust space 1340*b* is defined by the second shroud body 1346. A first portion 1341*a* of the gas flow 1341 transmitted from the first end 1310*a* of the conduit 1310 into the annular transmission space 1340*a* is received by each blade assembly 1320 and a second portion 1341*b* of the gas transmitted from the first end 1310*a* of the conduit 1310 into the exhaust space 1340*b* can be released into the ambient environment.

Each blade assembly 1320 may be configured to be moved when the received gas flow is transmitted from the first end 1310*a* of the conduit 1310 into the annular transmission space 1340*a*. The blade assembly 1320 may include a housing 1321, a projection 1322 disposed within the housing 1321, a beam 1323 pivotally coupled to the projection 1322 and blades 1324*a* and 1324*b*. A plurality of shafts 1325*a* and 1325*b* are provided to extend through the housing 1321 and are rotatably coupled to corresponding ones of blades 1324*a* and 1324*b*. Shafts 1325*a* and 1325*b* are also rotatably coupled to opposite ends of the beam 1323. The shafts 1325*a* and 1325*b* are slidably coupled to the housing 1321 by means of a low-friction sealing member (not shown) such as an O-ring formed of poly(tetrafluoroethene) (PTFE). The blade assembly 1320 further includes gas flow barriers 1326*a* and 1326*b* coupled to the housing 1321 and adjacent to blades 1324*a* and 1324*b*, respectively. Although FIGS. 13 and 14 illustrate wherein each blade assembly 1320 is disposed on the first shroud body 1344, it will be appreciated that at least one blade assembly 1320 may be disposed on the first shroud body 1346.

Constructed as exemplarily described above, the blades 1324*a* and 1324*b* are moveable into and out of a gas flow transmitted into the annular transmission space 1340*a*. When blade 1324*a* is disposed within the gas flow, gas within the gas flow acts upon the blade 1324*a* causing the blade 1324*a* to move toward the housing 1321. When the blade 1324*a* moves toward the housing 1321, the shaft 1325*a* is pushed radially outward.

Gas within the gas flow moves the blade 1324*a* moves toward the housing 1321 until the blade 1324*a* is sufficiently shielded from the gas flow by the gas flow barrier 1326*a*. When the shaft 1325*a* is pushed radially outward, the beam 1323 is rotated about the projection 1322 (e.g., about an axis that is substantially perpendicular to the longitudinal axis of the conduit 1310) so as to push the shaft 1325*b* radially inward. When the shaft 1325*b* is pushed radially inward, the blade 1324*b* (which was previously shielded from the gas flow by gas flow barrier 1326*b*) is moved away from the housing 1321 and into the gas flow transmitted into the annular transmission space 1340*a*. When blade 1324*b* is disposed within the gas flow, gas within the gas flow acts upon the blade 1324*b* causing the blade 1324*b* to move toward the housing 1321 and the reverse of the process described above is repeated.

A pair of electrical generators 1330*a* and 1330*b* may be coupled to each blade assembly 1320 via shafts 1325*a* and 1325*b*, respectively. The electrical generators 1330*a* and 1330*b* are configured to generate electricity when the blade assembly 1130 moves. For example, the electrical generators 1330*a* and 1330*b* may each include a stator element 1332 coupled to a support 1331 and a rotor element 1334 operably proximate to the stator element 132 and slidably moveable relative to the stator element 1332. The support 1331 may, for example, include a platform 1331*a* coupled to the first shroud body 1344 and supporting the stator element 1332, and a bracket member 1331*b* coupled to the first shroud body 1344 and the platform 1331*a* to prevent undesirable movement of the platform 1331*a* during operation of the energy recovery system 1300. In one embodiment, the stator element 1332 of each electrical generator 1330*a* and 1330*b* is provided as a coil of electrically conducting material (e.g., copper wire) and the rotor element 1334 of each electrical generator 1330*a* and 1330*b* is provided as a permanent magnet. Movement of the rotor element 1334 corresponds to movement of the blades 1324*a* or 1324*b* into and out of the gas flow transmitted by the annular transmission space 1340*a*. Thus, when the blades 1324*a* or 1324*b* move into and out of the gas flow transmitted by the annular transmission space 1340*a*, the rotor elements 1334 of the electrical generators 1330*a* and 1330*b* relative to the stator element 1332. When the rotor elements 1334 of the electrical generators 1330*a* and 1330*b* move relative to the stator element 1332, the electrical generators 1330*a* and 1330*b* generate electricity.

Although not shown, the energy recovery system 1300 may further include one or more gas flow deflection members 1350, similar to flow deflection members 1150, disposed on one or more sidewalls of the annular transmission space 1340*a*. For example, in an embodiment where the plurality of blade assemblies 1320 are disposed on a surface of the first shroud body 1344, one or more gas flow deflection members may be disposed on a surface of the second shroud body 1346.

To convert the kinetic energy of a gas flow into electricity, the energy recovery system 1300 may be disposed so that the first end 1310*a* of the conduit 1310 receives a portion of a gas flow generated by a gas flow source. The received gas flow is then transmitted from the first end 1310*a* of the conduit 1310 toward the second end 1310*b* of the conduit 1310. When transmitted from the first end 1310*a* of the conduit 1310, the received gas flow acts upon the blade assembly 1320. When the blade assemblies 1320 are acted upon by the received gas flow, each of the blades 1324*a* and 1324*b* moves in a predetermined direction (e.g., sliding in radially outward and inward directions that are substantially perpendicular to the longitudinal axis of the conduit 1310). Gas within the gas flow is then released into the ambient environment and/or the gas flow channel of the gas flow source (e.g., gas flow source 400) via the shroud member 1340. Thus, gas transmitted beyond the blade assemblies 1320 is released into the ambient environment and/or the gas flow channel of the gas flow source (e.g., gas flow source 400) via the shroud member 1340.

Movement of the plurality of blades 1324*a* and 1324*b* causes relative movement between the stator element 1332 and the rotor element 1334 of each of the electrical generators 1330*a* and each of the electrical generators 1330*b*, thereby causing the generation of electricity by the electrical generators 1330*a* and electrical generators 1330*b*. Thus, the electrical generators 1330*a* and 1330*b* are configured to generate electricity when the blade assemblies 1320 move.

Constructed as exemplarily described above, the energy recovery system 1300 may be disposed relative to a gas flow source, such as gas flow source 400, as exemplarily described with respect to any of FIGS. 4A-4C. Moreover, the cross-sectional area of the first end 1310*a* of the conduit 1310 may be less than the cross-sectional area of a gas flow channel, equal to the cross-sectional area of the gas flow channel, or greater than the cross-sectional area of the gas flow channel. It will be appreciated that, in some cases, the ability of the energy recovery system 1300 to generate electricity while preventing undesirable generation of back pressure within the gas flow source 400 may be dependent upon the number of blade assemblies 1320, the width of the annular transmission space 1340*a* (i.e., the distance between the first shroud body 1344 and the second shroud body 1346) and/or the width of the exhaust space 1340*b*. In one embodiment, the width of the annular transmission space 1340*a* may be as small as 1 inch. In one embodiment, the energy recovery system 1300 may be coupled to the exterior of the air handling unit 405 such that a distance D between the first end 1310*a* of conduit 1310 (or between the shroud member 1340) and the exhaust area 410 is effectively zero.

In one embodiment, the conduit 1310 as described above may be omitted. In such an embodiment, shroud member 1340 may function as the conduit 1310 receiving the gas flow generated by the gas flow source 400 and transmitting the received gas flow to blade assemblies 1320. In embodiments where the energy recovery unit 1300 is configured to generate electricity using a gas flow transmitted by a duct 414, a portion of the duct 414 may function as the first shroud body 1344.

FIG. 15 is a side view of an energy recovery system according to a sixth embodiment. FIG. 16 is a top view of the energy recovery system shown in FIG. 15. FIG. 17 is perspective schematic view of a blade incorporated within the energy recovery system shown in FIG. 15.

Referring to FIGS. 15-17, an energy recovery system 1500 may be generally characterized as including a conduit 1510, a blade assembly 1520, and a plurality of electrical generators 1530*a* and 1530*b*.

The conduit 1510 may include a first end 1510*a* and a second end 1510*b*. The first end 1510*a* may be configured to receive a portion 1541 of a gas flow generated by a gas flow source such as gas flow source 400. Further, the conduit 1510 may be generally configured to transmit the received gas flow 1541 from the first end 1510*a* toward the second end 1510*b*.

The blade assembly 1520 is coupled to the conduit 1510 via a shroud member 1540. The shroud member 1540 may be coupled to the second end 1510*b* of the conduit 1510. The blade assembly 1520 may be configured to be moved when the received gas flow is transmitted from the first end 1510*a* of the conduit 1510. Thus, the blade 1520 may overlap with the gas flow channel so as to receive a first portion 1541*a* of the gas flow transmitted by the gas flow channel. A second portion 1541*b* can bypass the blade.

The blade assembly 1520 may, for example, include a plurality of rotatable shafts 1522*a* and 1522*b* and a plurality of blades 1524 coupled to the rotatable shafts 1522*a* and 1522*b* via wheels 1526*a* and 1526*b*, respectively. Wheel 1526*a* may include a rim 1527*a*, a plurality of spokes 1528*a* each having a first end connected to the rim 1527*a* and a second end connected to the rotatable shaft 1522*a*. Similarly, wheel 1526*b* may include a rim 1527*b*, a plurality of spokes 1528*b* each having a first end connected to the rim 1527*b* and a second end connected to the rotatable shaft 1522*b*. Rotatable shaft 1522*a* is connected between electrical generator 1530*a* and the plurality of spokes 1528*a*. Similarly, rotatable shaft 1522b is connected between electrical generator 1530b and the plurality of spokes 1528b. Opposite ends of each of the blades 1524 are connected to the rims 1527a and 1527b. Rotatable shafts 1522a and 1522b are substantially coaxial. Constructed as exemplarily described above, the rotatable shafts 1522a and 1522b move when the blades 1524 move. In one embodiment, each blade 1524 is rotatable about an axis that is substantially perpendicular to a direction along which gas flow is transmitted from the first end of the conduit 1510.

According to some embodiments, a longitudinal shape of each blade 1524 generally corresponds to the shape of an edge of the gas flow channel transmitting the gas flow that is intended to act upon the blade assembly 1520. For example, if an edge of the gas flow channel is curved, then the longitudinal shape of each blade 1524 is similarly curved. In one embodiment, and as best shown in FIG. 17, each blade 1524 may be provided as an airfoil having a leading edge 1524a and a trailing edge 1524b. When provided as an airfoil, each blade 1524 may produce lift at certain times (e.g., when the leading edge 1524a of a blade 1524 is disposed within the gas flow and is oriented at a predetermined angle of attack relative to the flow direction of the gas flow) as the blade assembly 1520 moves about the longitudinal axis of the shafts 1522a and 1522b. The lift produced may further facilitate movement of the blade assembly 1520 about the longitudinal axis of the shafts 1522a and 1522b.

The electrical generators 1530a and 1530b may be coupled to the blade assembly 1520 via shafts 1522a and 1522b, respectively. Accordingly, the electrical generators 1530a and 1530b may be coupled to the blade assembly 1520 in a direct-drive manner. It will be appreciated that one or more of the electrical generators 1530a and 1530b may be coupled to the blade assembly 1520 by any suitable means. For example, one or more of the electrical generators 1530a and 1530b may be coupled to the blade assembly 1520 by gears, by a belt and pulley system, or the like. The electrical generators 1530a and 1530b are configured to generate electricity when the blade assembly 1520 moves. In one embodiment, each of the electrical generators 1530a and 1530b is configured to generate the same or a different power output when the blade assembly 1520 moves. The electrical generators 1530a and 1530b may, for example, be coupled to the gas flow source 400 (e.g., the air handling unit 405) via mounting supports 1532.

To convert the kinetic energy of a gas flow into electricity, the energy recovery system 1500 may be disposed so that the first end 1510a of the conduit 1510 receives a portion of a gas flow generated by a gas flow source. The received gas flow is then transmitted from the first end 1510a of the conduit 1510 toward the second end 1510b of the conduit 1510. When transmitted from the first end 1510a of the conduit 1510, the received gas flow acts upon the blade assembly 1520 to move the blades 1524. In one embodiment, the received gas flow acts upon blades 1524 that are proximal to the gas flow channel of the gas flow source (e.g., blades 1524 in the lower-right quadrant of the blade assembly 1520 illustrated in FIG. 15) by pushing against such proximally located blades 1524. In one embodiment, the received gas flow acts upon blades 1524 that are distal to the gas flow channel of the gas flow source (e.g., blades 1524 in the upper-right quadrant of the blade assembly 1520 illustrated in FIG. 15) by moving around such distally located blades 1524 in an asymmetric manner to induce lift. Gas within the gas flow is then released into the ambient environment and/or the gas flow channel of the gas flow source (e.g., gas flow source 400) via the shroud member 1540. Thus, gas transmitted beyond the blade assembly 1520 is released into the ambient environment and/or the gas flow channel of the gas flow source (e.g., gas flow source 400) via the shroud member 1540. Movement of the plurality of blades 1524 causes corresponding movement of the shafts 1522a and 1522b which, in turn, causes the electrical generators 1530a and 1530b to generate electricity.

Constructed as exemplarily described above, the energy recovery system 1500 may be disposed relative to a gas flow source, such as gas flow source 400, as exemplarily described with respect to any of FIGS. 4A-4C. Moreover, the cross-sectional area of the first end 1510a of the conduit 1510 may be less than the cross-sectional area of a gas flow channel of the gas flow source 400. It will be appreciated that, in some cases, the ability of the energy recovery system 1500 to generate electricity while preventing undesirable generation of back pressure within the gas flow source 400 may be dependent upon the degree to which the blade assembly 1520 overlaps with the gas flow channel. Although FIGS. 15 and 16 illustrate only one energy recovery system 1500, it will be appreciated that any number of energy recovery systems 1500 may be disposed relative to the gas flow source. For example, a plurality of energy recovery systems 1500 may be disposed along the perimeter of the exhaust area 410 of the air handling unit 405.

Figure 18:
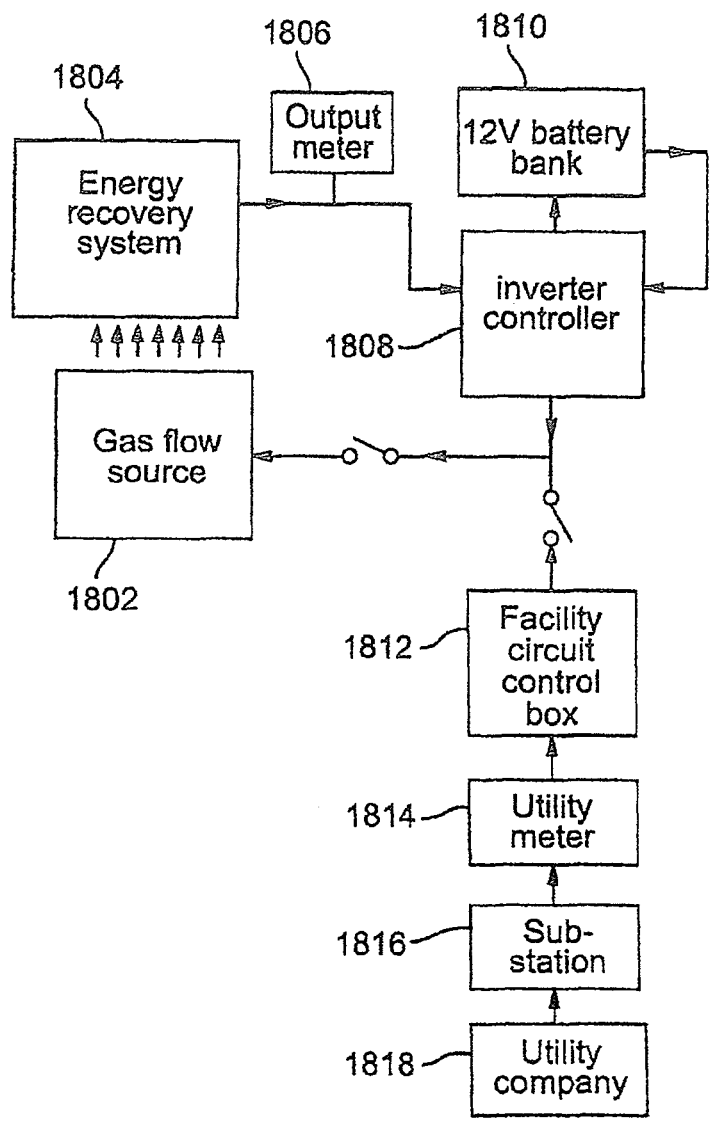
FIG. 18 illustrates an on-site powering implementation in which an energy recovery system may be used as a power source to facilitate operation of a gas flow source.

FIG. 18 illustrates an on-site powering implementation in which an energy recovery system may be used as a power source to facilitate operation of a gas flow source.

Referring to FIG. 18, kinetic energy associated with a gas flow generated by a gas flow source 1802 may be converted into electricity by an energy recovery system 1804.

The energy recovery system 1804 may be provided as exemplarily described with respect to one or more of the embodiments above. In one embodiment, the power output of the energy recovery system 1804 may be monitored at an output meter 1806.

The output of the energy recovery system 1804 may be transmitted to an inverter/controller unit 1808. In one embodiment, the inverter/controller unit 1808 may convert power generated by the energy recovery system 1804 (DC power) into power suitable to operate the gas flow source 1802 (AC power). In another embodiment, the inverter/controller unit 1808 may store the power generated by the energy recovery system 1804 (DC power) in, for example, a 12V battery bank 1810. Power stored in the 12V battery bank 1810 may be used to operate the gas flow source 1802 at a later time.

Items 1812, 1814, 1816 and 1818 refer to a facility circuit control box, a utility meter, a sub-station, and a utility company, respectively, all of which are involved in delivering power to the gas flow source 1802. As shown in FIG. 18, power can be transmitted from the facility circuit control box 1812 to the gas flow source 1802. Accordingly, when the gas flow source 1802 is being operated using power generated by the energy recovery system 1804, less power is required from the utility company 1818 (via sub-station 1816 and sub-station 1814).

Figure 19:
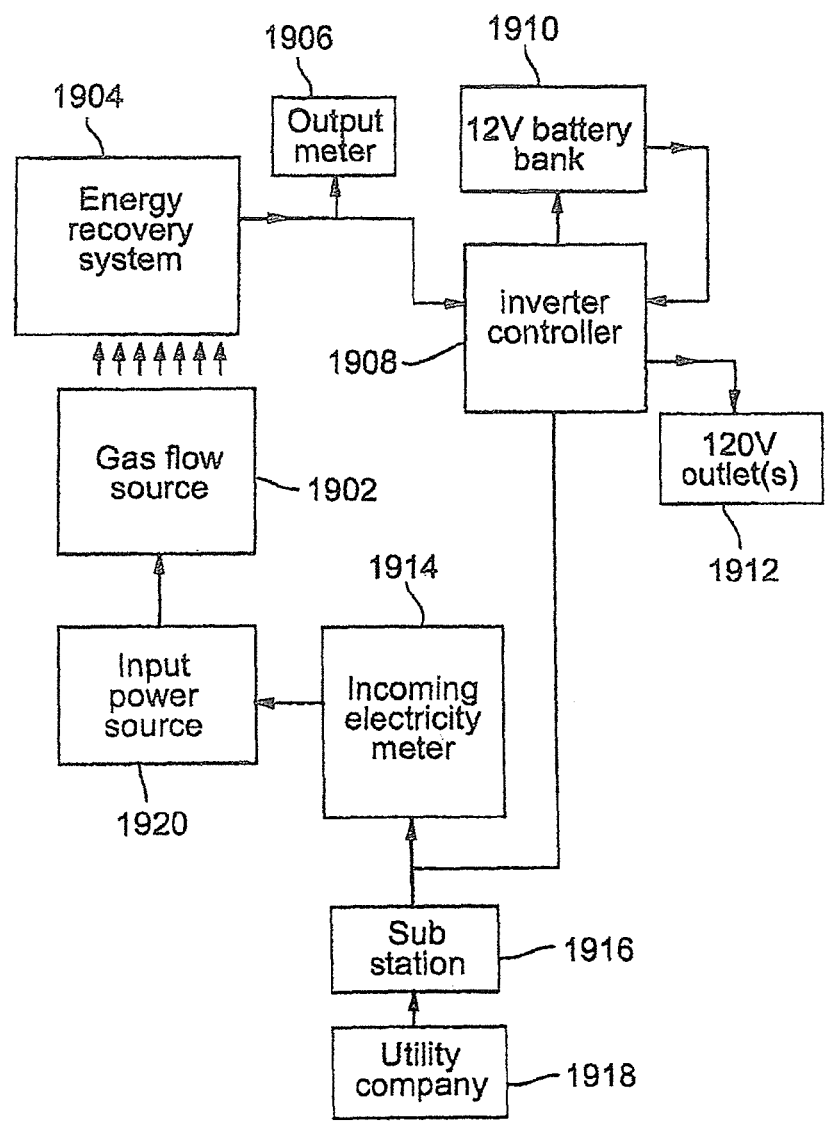
FIG. 19 illustrates a net metering implementation capable for use with an energy recovery system.

FIG. 19 illustrates a net metering implementation capable for use with an energy recovery system.

Referring to FIG. 19, kinetic energy associated with a gas flow generated by a gas flow source 1902 may be converted into electricity by an energy recovery system 1904. The energy recovery system 1904 may be provided as exemplarily described with respect to one or more of the embodiments above. In one embodiment, the power output of the energy recovery system 1904 may be monitored at an output meter 1906.

The output of the energy recovery system 1904 may be transmitted to an inverter/controller unit 1908. In one embodiment, the inverter/controller unit 1908 may convert power generated by the energy recovery system 1904 (DC power) into AC power and transmit the converted power to an existing power transmission grid connecting a sub-station 1916 to an incoming electricity meter 1914. The gas flow source 1902 may be operated upon receiving power from an input power source 1920 which, in turn, receives power transmitted from the incoming electricity meter 1914. In another embodiment, the inverter/controller unit 1908 may convert power generated by the energy recovery system 1904 (DC power) into AC power and transmit the converted power to one or more electrical outlets (e.g., 120V outlets 1912) that are off of the power transmission grid. Items 1918 refers to a utility company involved with delivering power to the gas flow source 1902 via the sub-station 1916, the incoming electricity meter 1914 and the input power source 1920.

The foregoing is illustrative of example embodiments and is not to be construed as limiting thereof Therefore, it is to be understood that the foregoing is illustrative of example embodiments and is not to be construed as limited to the specific embodiments disclosed, and that modifications to the disclosed embodiments, as well as other embodiments, are intended to be included within the scope of the appended claims.

The invention claimed is:

1. An energy recovery system, comprising:
   a conduit affixed to an exhaust outlet of a gas flow channel of a gas flow source to receive a gas flow from the exhaust outlet;
   a blade assembly coupled to the conduit, wherein the blade assembly is configured to be moved by the gas flow; and
   an electrical generator coupled to the blade assembly, wherein the electrical generator is configured to generate electricity when the blade assembly moves; and
   a venting area around the conduit to bypass a portion of the gas flow around the blade assembly to limit backpressure on the gas flow source;
   in which the exhaust outlet includes multiple outlets and the conduit has a single inlet end spaced to overlap portions of the multiple exhaust outlets to provide the venting area.

2. An energy recovery system according to claim 1 in which the venting area includes one or more gas intake ports around the conduit.

3. Energy recovery system according to claim 1 in which the conduit has an inlet end spaced from the exhaust outlet to provide the venting area.

* * * * *